(12) United States Patent
Cookman et al.

(10) Patent No.: US 11,686,853 B2
(45) Date of Patent: Jun. 27, 2023

(54) MULTIPATH MITIGATION FOR MULTIBAND GNSS RECEIVER

(71) Applicant: QUALCOMM Incorporated, San Diego, CA (US)

(72) Inventors: Jordan Cookman, San Jose, CA (US); Krishnaranjan Rao, Sunnyvale, CA (US); Sandeep Padmanabhan, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/809,265

(22) Filed: Jun. 27, 2022

(65) Prior Publication Data
US 2022/0326390 A1 Oct. 13, 2022

Related U.S. Application Data

(63) Continuation of application No. 17/081,973, filed on Oct. 27, 2020, now Pat. No. 11,378,697.
(Continued)

(51) Int. Cl.
*G01S 19/22* (2010.01)
*G01S 19/42* (2010.01)
(Continued)

(52) U.S. Cl.
CPC .............. *G01S 19/22* (2013.01); *G01S 19/24* (2013.01); *G01S 19/428* (2013.01); *G01S 19/32* (2013.01)

(58) Field of Classification Search
CPC .......... G01S 19/22; G01S 19/24; G01S 19/32; G01S 19/428
See application file for complete search history.

(56) References Cited

U.S. PATENT DOCUMENTS 6,420,999 B1 * 7/2002 Vayanos ................. G01S 5/021
701/473
2006/0273953 A1 12/2006 Watson et al.
(Continued)

FOREIGN PATENT DOCUMENTS

CN 106054216 A * 10/2016 ............. G01S 19/28
CN 109375247 A * 2/2019 ............. G01S 19/28
(Continued)

OTHER PUBLICATIONS

Ioannides R.T., et al., "Coherent Integration of Future GNSS Signals", Proceedings of the 19th International Technical Meeting of the Satellite Division of The Institute of Navigation (ION GNSS 2006), 16 pages, 2006.

*Primary Examiner* — Bernarr E Gregory
*Assistant Examiner* — Fred H Mull
(74) *Attorney, Agent, or Firm* — Thien T. Nguyen

(57) ABSTRACT

In some aspects, a mobile device is configured to obtain a set of satellite signal measurements through measuring, for each satellite in a first plurality of satellites, a first signal from the satellite in a first frequency band and a second signal from the satellite in a second frequency band. The first plurality of satellites can include at least a first satellite, a second satellite, and a third satellite. The mobile device can determine that at least one measurement in the set of satellite signal measurements is impaired, based on a difference between a measurement of the first signal from a particular satellite (e.g., the first satellite, the second satellite, or the third satellite) and a measurement of the second signal from the particular satellite. A position of the mobile device can then be determined based on non-impaired measurements in the set of satellite signal measurements.

26 Claims, 11 Drawing Sheets

Related U.S. Application Data

(60) Provisional application No. 62/928,204, filed on Oct. 30, 2019.

(51) Int. Cl.
    *G01S 19/24*    (2010.01)
    *G01S 19/32*    (2010.01)

(56) References Cited

U.S. PATENT DOCUMENTS

| | | | | |
|---|---|---|---|---|
| 2007/0008216 | A1* | 1/2007 | Ganguly | G01S 19/32 |
| | | | | 342/357.62 |
| 2014/0070991 | A1* | 3/2014 | Liu | G01S 19/428 |
| | | | | 342/357.63 |
| 2014/0369452 | A1* | 12/2014 | Dubash | G01S 19/33 |
| | | | | 375/350 |
| 2015/0362597 | A1* | 12/2015 | Syrjärinne | G01S 19/27 |
| | | | | 342/357.58 |
| 2017/0343677 | A1* | 11/2017 | Capet | G01S 19/36 |
| 2021/0116575 | A1* | 4/2021 | Hillier | G01S 19/072 |
| 2021/0132236 | A1 | 5/2021 | Cookman et al. | |

FOREIGN PATENT DOCUMENTS

| | | | |
|---|---|---|---|
| JP | 2010139318 | | 6/2010 |
| JP | 2010139318 A * | | 6/2010 |
| JP | 2010164339 | | 7/2010 |
| KR | 101667331 B1 * | | 10/2016 |
| WO | WO 2010098465 | | 9/2010 |
| WO | WO 2018124250 | | 7/2018 |

\* cited by examiner

| Satellite | Pseudorange Measurement | Carrier Frequency | Time | Difference | Threshold | Flag |
|---|---|---|---|---|---|---|
| Sat 1 | 23489263.4 | L1C | T1 | 815.9 | 62 | 753.9 |
| Sat 1 | 23488447.5 | L2C | T1 | 815.9 | 41 | 0 |
| Sat 2 | 21269560.8 | L1 C/A | T2 | 7.6 | 51 | 0 |
| Sat 2 | 21269553.2 | L1C | T2 | 7.6 | 32 | 0 |
| Sat 3 | 23861472.2 | L2C | T3 | 30.5 | 31 | 0 |
| Sat 3 | 23861441.7 | L5 | T3 | 30.5 | 28 | 2.5 |
| Sat 4 | 22683760.1 | L1C | T4 | 645.3 | 46 | 599.3 |
| Sat 4 | 22683114.8 | L5 | T4 | 645.3 | 25 | 0 |
| Sat 5 | 23651421.6 | L1 C/A | T5 | 6.5 | 48 | 0 |
| Sat 5 | 23651428.1 | L5 | T5 | 6.5 | 27 | 0 |

MULTIPATH MITIGATION FOR MULTIBAND GNSS RECEIVER

RELATED APPLICATIONS

This application is a continuation of U.S. Non-Provisional application Ser. No. 17/081,973, filed Oct. 27, 2020, entitled "MULTIPATH MITIGATION FOR MULTIBAND GNSS RECEIVER", which claims the benefit of U.S. Provisional Application No. 62/928,204, filed Oct. 30, 2019, entitled "MULTIPATH MITIGATION FOR MULTIBAND GNSS RECEIVER", each of which is assigned to the assignee hereof and incorporated herein in its entirety by reference.

BACKGROUND

Field of Disclosure

The technology discussed below relates generally to identifying and compensating for measurements performed on satellite signals that are impaired, e.g., having errors due to multipath loss, lack of direct line-of-sight, and other factors that typically influence measurement errors.

Description of Related Art

Mobile devices may receive signals from a Global Navigation Satellite System ("GNSS") for various reasons, including to calculate a position of the mobile device. In some situations, the mobile device may not have a direct line-of-sight to the satellite, and the signals from the satellite may be reflected and/or attenuated. In some cases, the same signal may reach the user device through more than one path, commonly called multipath. In a multipath scenario, the signal received on the line-of-sight path may be weak due to blockages in the line-of-sight path, but could still be substantially free of measurement error despite being attenuated. The same signal received over a reflected path may experience little or no attenuation depending on the material of the reflector(s), but may nevertheless be impaired due to having measurement error. For example, when distance is measurement based on time of flight, the apparent distance of a satellite can be farther than the actual distance due to increased travel time of the satellite's signal along a reflected path.

Mobile devices often rely upon satellite signals to determine global positioning or, in some cases, to adjust the clock within the device. The satellite signals come from one or more satellites in one or more constellations of satellites. Ranging signals transmitted from the satellites are received by mobile devices, and in some cases the signals are direct and clear, which allow the mobile device to utilize the signal to, for example, calculate its position (e.g., a latitude and longitude pair or other geodetic coordinates). However, for many reasons, the satellite signals may be impaired. For example, reflections of the signals can cause the same signal to reach a mobile device through more than one path, commonly called multipath. In some cases, only a reflection may reach the mobile device (e.g., when there is no direct line of sight). These impairments can cause position calculations that use the data from the signal to be inaccurate. For example, a reflected signal may cause a position calculation to be incorrect by miles. Identifying impairment can be challenging because it is often not apparent which signals are impaired. Further, once a signal or its associated measurement has been identified as being impaired, the problem remains as to how to handle the impairment, specifically, whether to use a measurement from an impaired signal as part of a calculation.

BRIEF SUMMARY

In urban environments, GNSS signals are subject to multipath impairment, where the signals arrive at the receiver antenna via multiple paths, including both direct line-of-sight and/or reflected paths. Multipath impairments are a substantial source of GNSS position error. One solution described herein utilizes measurements of multiple signals from a single satellite to identify and compensate for impairment so that position error is minimized. In some aspects, signals from multiple satellites are measured to identify impairment in different regions of the sky. Various techniques for compensating for impairment are also described. In some aspects, an impaired measurement is prevented from being used in a position estimate or other measurement based calculation, or the contribution of the impaired measurement is limited relative to the contribution of an unimpaired measurement. In other aspects, an impaired measurement is corrected based on historical information about the impaired measurement relative to an unimpaired measurement. The techniques described herein can be applied to improve the accuracy of position estimates and other types of calculations that depend on measurements from satellite signals. For instance, a position estimate obtained after excluding or limiting an impaired measurement can be used to perform a clock correction, thereby enabling the receiver to synchronize itself to a clock reference and, consequently, engage in synchronous communications with another device.

Techniques described herein address these and other issues by providing a system of one or more computers that can be configured to perform particular operations or actions by virtue of having software, firmware, hardware, or a combination of them installed on the system that in operation causes the system to perform the operations or actions. One or more computer programs can be configured to perform particular operations or actions by virtue of including instructions that, when executed by data processing apparatus, cause the apparatus to perform the actions. The one or more computer programs can be stored on non-transitory computer readable media (e.g., computer storage devices that form memory) accessible to the one or more computers.

One general aspect includes a method of mitigating multipath errors. The method may be performed by a mobile device. The mobile device may calculate a first pseudorange measurement based on a first signal received from a satellite on a first carrier frequency. The mobile device may also calculate a second pseudorange measurement based on a second signal received from the same satellite on a second carrier frequency. The mobile device may compute a difference between the first pseudorange measurement and the second pseudorange measurement. The mobile device may determine, based on the difference being above a threshold value and one of the first pseudorange measurement and the second pseudorange measurement being larger, that the larger pseudorange measurement is an impaired measurement. Based on determining that the larger pseudorange measurement is an impaired measurement, the mobile device at least one of: (1) limits an extent to which the impaired measurement is used in a first calculation performed by a processing unit of the mobile device using on one or more of the first pseudorange measurement and the second pseudorange measurement, or (2) communicates an impairment indication to a processing unit configured to perform a second calculation using one or more of the first pseudorange measurement and the second pseudorange measurement. Other embodiments of this aspect include corresponding computer systems, apparatus, and computer programs recorded on one or more computer storage devices, each configured to perform the actions of the methods.

In some embodiments, a device configured to perform pseudorange measurements is further configured to identify, based on pseudorange measurements from multiple satellites, a region of the sky that has an impaired signal. The device may generate a digital map in which the sky is divided into different regions, each region encompassing a range of azimuth and/or elevation values (e.g., four quadrants that sweep across azimuth, each quadrant corresponding to a compass direction). Regions that are experiencing impairment can be marked. When there is impairment in one region, the device can perform a position calculation based on a signal in another region, compensate for the impairment so that one or more signals from the impaired region can be used for position calculation, or both.

In some embodiments, the results of an impairment determination can be used to facilitate synchronous communications, for example, communication between a vehicle and another vehicle based on exchange of vehicle-to-everything (V2X) messages. Synchronous communication involves coordinated sending and receiving of messages between two or more devices. For instance, each device may be assigned certain time slots in which to transmit or receive messages. To coordinate sending and receiving, each device participating in the synchronous communication should be synchronized to the same time reference (e.g., Global Positioning System time). If a device attempts to synchronize its local clock to a time reference using an impaired signal, this may result in the local clock being set to an incorrect time, which in turn leads to degraded communication performance (e.g., interference between devices). Accordingly, the compensation techniques disclosed herein can be applied to keep a local clock synchronized.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 3 is an example table of data for a mobile device receiving satellite ranging signals.

Like reference symbols in the various drawings indicate like elements, in accordance with certain example implementations. In addition, multiple instances of an element may be indicated by following a first number for the element with a letter or a hyphen and a second number. For example, multiple instances of a satellite 110 may be indicated as 110-1, 110-2, 110-3 etc. or as 110*a*, 110*b*, 110*c*, etc. When referring to such an element using only the first number, any instance of the element is to be understood (e.g., satellite 110 in the previous example would refer to satellites 110-1, 110-2, and 110-3 or to satellites 110*a*, 110*b*, and 110*c*).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Throughout the present disclosure, it has proven convenient to at times refer to impairment of signals transmitted from satellites. At other times, impairment has been used to describe measurements obtained from satellite signals (e.g., an impaired pseudorange measurement). It will be understood that an impaired satellite signal can lead to an impairment measurement obtained or calculated based on the impaired satellite signal, and that the impairment of a satellite signal can be inferred from the impairment of its corresponding measurement or vice versa.

Disclosed herein are techniques for identifying and marking pseudorange measurements calculated from satellite signals that are likely impaired. In some embodiments, the amount of impairment may be determined as well. Once a pseudorange measurement has been marked as impaired (e.g., by setting the value of a flag), the positioning engine or software application that may calculate the position of the mobile device can use the marking and/or amount of impairment to weight or exclude the impaired measurement from positioning calculations. Other remedial actions are also possible, such as correcting an impaired pseudorange measurement based on a pseudorange measurement that is not (or less) impaired. For example, in some embodiments, the mobile device may compute a correction value for a pseudorange measurement based on an average pseudorange measurement obtained using different signals transmitted by the same satellite (e.g., a first signal in the L1 band and a second signal in the L5 band, where one of the two signals is impaired, but the other signal is not).

Figure 1:
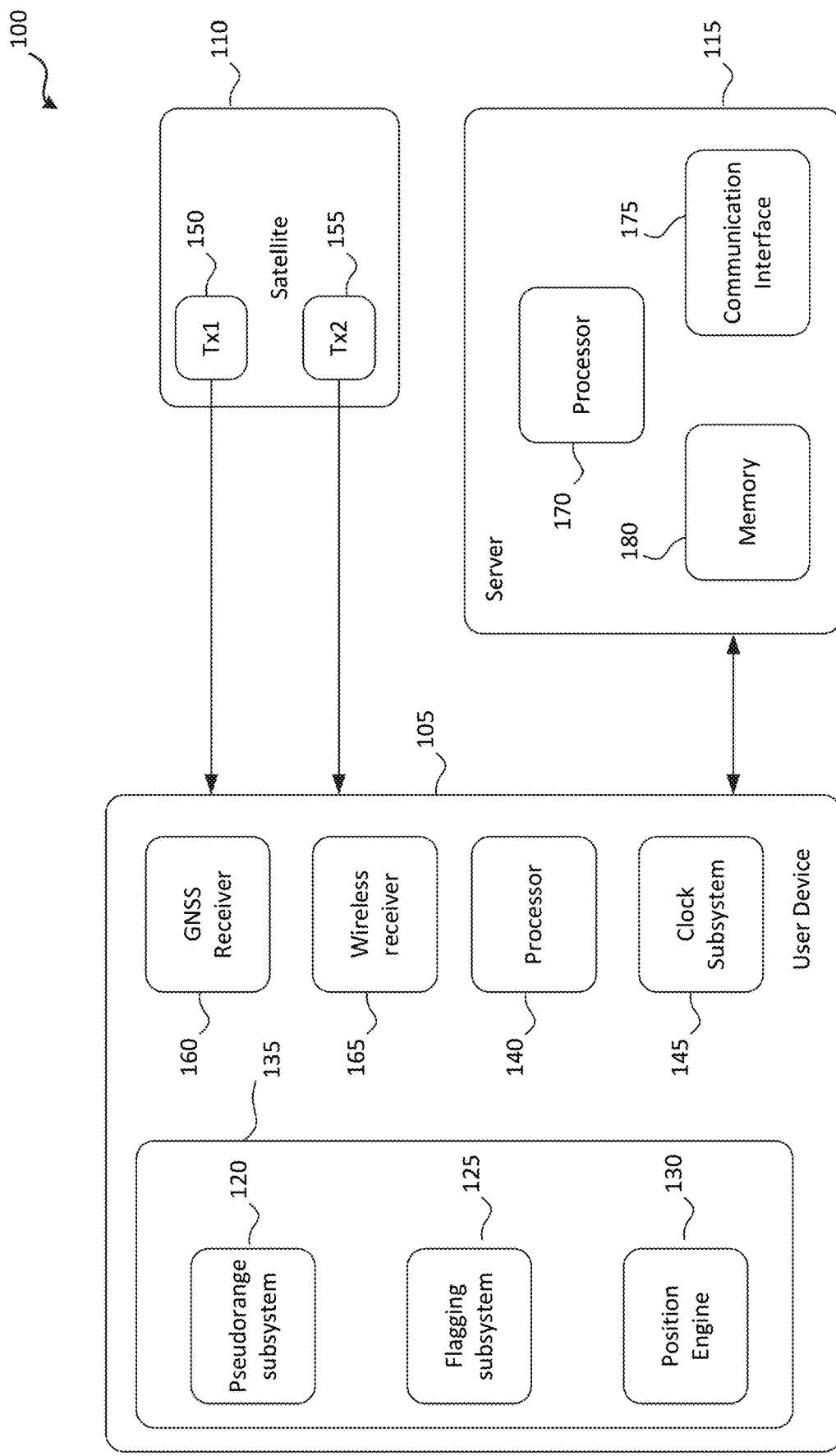
FIG. 1 is a simplified block diagram of a communication system.

FIG. 1 illustrates a simplified block diagram of an example communication system 100. The communication system 100 includes a satellite 110, a server 115, and a user device 105.

Satellite 110 may be any satellite in any GNSS satellite constellation. There are multiple satellite constellations including the United States' constellation Global Positioning System ("GPS"), Russia's Global Navigation Satellite System ("GLONASS"), and the European Union's Galileo. Each constellation uses specific carrier frequencies for various ranging signals. For example, the GPS constellation transmits L1 signals at a carrier frequency of 1.57542 Gigahertz, L2 signals at a carrier frequency of 1.2276 Gigahertz, and L5 signals at a carrier frequency of 1.17645 Gigahertz. The GPS constellation transmits ranging signals for civilian use on each of these carrier frequencies. These ranging signals are commonly called L1C, L1 C/A, L2C, and L5. Throughout this disclosure these carrier frequencies are used as examples, though any carrier frequencies or ranging signals used by any satellite constellation may be used for the purposes of implementing the techniques described herein. Each satellite in a constellation is usually equipped with more than one transmitter, and each transmitter may use a different carrier frequency. For example, a satellite may have one transmitter that transmits L1C signals and another transmitter that transmits L5 signals.

While only a single satellite 110 is shown in FIG. 1, there may be any number of satellites 110 in communication system 100. Satellite 110 may transmit ranging signals by at least two transmitters, Transmitter 150 and Transmitter 155. The transmitters 150 and 155 may have different characteristics. For example, transmitters 150 and 155 may transmit ranging signals on different carrier frequencies. Transmitter 150 may have a different chip rate than transmitter 155. Transmitter 150 may use a different modulation type than transmitter 155. These differing characteristics may result in the signals experiencing different delays due to reflection, atmospheric interference, and so forth. Thus, there may be times when a signal from one transmitter (e.g., transmitter 150) is impaired while a signal from the other transmitter (e.g., transmitter 155) is not impaired. However, in situations where signals from both transmitters 150 and 155 are impaired due to the same cause (e.g., a physical obstruction), the signal from transmitter 150 tends to be impaired to a similar extent compared the signal from transmitter 155. Accordingly, when signals from both transmitters are impaired, it can be assumed that there is only a small difference between a pseudorange or other measurement obtained using transmitter 150 and a pseudorange or other measurement obtained using transmitter 155.

User device 105 may be a mobile device such as, for example, a mobile phone, a tablet, a laptop, a smart watch, a vehicle, or any other suitable mobile computing device. While only a single user device 105 is depicted in FIG. 1, communication system 100 may include any number of user devices. For simplicity of explanation, FIG. 1 does not depict user device 105 as including components such as transceivers, processors, and the like. User device 105 may be User Equipment (UE) 900 depicted in FIG. 9. As discussed below in reference to the embodiment of FIG. 9, UE 900 can include components such as a processor, a bus, and a transceiver, and the like.

User device 105 includes memory 135 (including pseudorange subsystem 120, flagging subsystem 125, position engine 130), processor 140, clock subsystem 145, GNSS receiver 160, and wireless receiver 165. User device 105 may include more or fewer components that perform the functionality as described herein without departing from the spirit of the disclosure. Further, additional components are not shown for simplicity of description of the user device 105 with respect to the embodiment of FIG. 1. Examples of such additional components are described in reference to the UE 900 of FIG. 9.

Memory 135 may be any suitable memory including volatile and/or nonvolatile memory. Memory 135 may correspond to a memory 960 shown in FIG. 9. Memory 135 may include both short and long-term storage devices. Memory 135 may store, for example, information about pseudorange measurements and associated flags, some of which information is depicted in table 300 of FIG. 3. Memory 135 may further store instructions for execution by the processor 140 including, for example, software applications executed by the processor 140. The software in memory 135 may implement pseudorange subsystem 120, flagging subsystem 125, and position engine 130. However, the pseudorange subsystem 120, flagging subsystem 125, and position engine 130 can be implemented in hardware or a combination of hardware and software.

Pseudorange subsystem 120 may calculate a pseudorange measurement upon receipt of a ranging signal from transmitter 150 or transmitter 155 of satellite 110. While not shown, a transceiver on user device 105 receives the ranging signal and may provide the ranging signal to pseudorange subsystem 120. In very simple terms, the pseudorange measurement is a rough calculation of the distance from the user device 105 to the satellite 110. The time delay of the signal to arrive at the user device 105 based on a timestamp included in the ranging signal may be used, in part, to calculate the pseudorange measurement. However, the result is a not a true distance because the signal is delayed and calculations are impacted by various factors including, for example atmospheric effects, clock offsets, and the like. In some embodiments, pseudorange subsystem 120 may apply a pseudorange equation or model to calculate the pseudorange measurement based on the ranging signal. The ranging signal may include a timestamp and a pseudorandom sequence, which is associated with a specific transmitter 150, 155 of a specific satellite 110. Ephemeris data that describes location information for satellites at any time may be known or provided to the user device 105 from, for example, server 115. In some instances, the ephemeris data for the satellite 110 may be included in the ranging signal. All of the available information including the timestamp, the characteristics (e.g., chiprate) of the transmitter 150, 155 from which the signal was received, and the characteristics of the signal (e.g., modulation type, carrier frequency, and so forth) may be used to calculate the pseudorange measurement.

The pseudorange subsystem 120 generally receives at least two signals from each satellite on differing carrier frequencies (e.g., a carrier in the L1 band and a carrier in the L5 band) that were transmitted at substantially the same time. For example, at time T1, satellite 110 transmits a first signal on a first carrier frequency from transmitter 150, and at time T1 satellite 110 transmits a second signal on a second carrier frequency from transmitter 155. User device 105 receives both the first and second signals and provides each to pseudorange subsystem 120. Pseudorange subsystem 120 can calculate two different pseudorange measurements, one from each signal, that each represents a distance between the user device 105 and the satellite 110 at time T1. The pseudorange measurement from the first signal and the pseudorange measurement from the second signal should be approximately the same if the first and second signals were not impacted by any error or delay. In practice each signal will have some atmospheric delay and possibly be impacted by reflection, among other possible errors. Therefore, the first pseudorange measurement and the second pseudorange measurement will typically not be exactly the same. Moreover, in cases where one signal is significantly impacted so as to be impaired but the other signal is not impaired, there may be a large difference between the first pseudorange measurement and the second pseudorange measurement.

Flagging subsystem 125 may receive the pseudorange measurements and determine whether one of the pseudorange measurements may be impaired. In practice, the smaller of the two pseudorange measurements is likely to be line-of-sight and the larger of the two pseudorange measurements is likely to be based on an impaired (e.g., reflected) signal. However, because of known atmospheric delays and characteristics of the transmitter 150, 155, that is not always the case. Further, in some embodiments, the two signals may both be line-of-sight, but one may be weaker than the other due to the signal or transmitter characteristics and/or the effect that atmospheric delays may have on the signals, or the user device 105 may simply be able to detect one carrier frequency better than the other. Flagging subsystem 125 can determine which, if either, of the two signals may be impaired.

To determine which, if any, of the two signals may be impaired, flagging subsystem 125 can calculate a difference between the two pseudorange measurements. There can be expected to be timing delays associated with any given signal path. The difference in timing delay between two signal paths may impact or offset the difference between the two pseudorange measurements, creating a bias between the two pseudorange measurements. The bias may be due to different receiver characteristics of the user device 105. Some portion of the bias may be digital and other portions due to analog circuitry, and these portions of the bias may vary based on time, temperature, etc. The bias may be calculated and removed so that the pseudorange measurements are not impacted by the bias.

The bias may be removed by subtracting a constant bias value from the calculated difference or by subtracting a bias value that is dynamically estimated by another subsystem in the user device 105. For example, the timing delay may be calculated based on the timing measurements obtained from each signal path. The received time of two signals on two signal paths (e.g., different frequencies) from the same satellite 110 can be compared to identify the timing delay. In some embodiments, the average or median difference between the receive times of the two signal paths can be calculated. In some embodiments, the average or median delay on each path can be calculated using test data and stored for use on future pseudorange measurements based on signals from the same satellite transmitter. In some embodiments, the delay or bias can be solved for as an unknown variable in the position estimation calculation. In some embodiments, the delay associated with each signal path may be calculated and subtracted from the respective timing measurement used to calculate the pseudorange measurement for each signal. In some embodiments, the bias may be calculated and subtracted from the respective pseudorange measurements determined based on the associated signal. In some embodiments, the bias can be subtracted from the overall difference between the pseudorange measurements.

Flagging subsystem 125 may calculate a dynamic threshold associated with each satellite transmitter or have a fixed threshold value for each satellite transmitter. Flagging subsystem 125 may apply the threshold for a particular transmitter to determine whether the signal from the particular transmitter is impaired and, if the so, mark a pseudorange measurement derived from the impaired signal as also being impaired. Because each satellite transmitter has different characteristics, including the carrier frequency used, the modulation type for transmission of the signal, and the chiprate of the transmitter, the threshold value used for each transmitter may differ. In some embodiments, the threshold value may be stored in a table in, for example, memory 135.

Flagging subsystem 125 may compare the calculated difference between the two pseudorange measurements (in some embodiments after a bias has been removed) against a first threshold associated with the first transmitter 150. If the difference is greater than the first threshold and the first pseudorange measurement is larger than the second pseudorange measurement, flagging subsystem 125 can mark the first pseudorange measurement as impaired. As indicated above, when one signal is impaired and the other signal is not impaired, the pseudorange measurement from the impaired signal is usually larger. Thus, the magnitudes of the pseudorange measurements can be used to identify which signal is impaired. In the case that the difference is larger than the first threshold and the first pseudorange measurement is the larger of the two, the first signal was likely delayed by multipath or otherwise attenuated in some way. Rather than merely discarding the first pseudorange measurement, the measurement may be marked as possibly impaired, although in some embodiments, the first pseudorange measurement may be discarded. In some embodiments, the calculated difference, or the calculated difference over the threshold amount, may be used to indicate the amount of impairment. For example, the flag may be set by storing the flag associated with the first signal and the first pseudorange measurement in memory 135, and in some embodiments, the calculated difference, or the calculated difference over the threshold, may be the flag value stored. In some embodiments, the flag may be a binary flag and setting the value to 1 may mean the pseudorange measurement is impaired, while setting the value to 0 may mean the pseudorange measurement is not impaired. If the calculated difference is not larger than the first threshold, or if the first pseudorange measurement is not larger than the second pseudorange measurement, the first flag associated with the first pseudorange measurement may not be set, may be set to a null or zero value, or any other suitable step may be taken to store an indication that the first pseudorange measurement is not impaired.

If the first pseudorange measurement is determined to be impaired, the second pseudorange measurement may be marked as unimpaired in memory 135. For example, the flag associated with the second pseudorange measurement may not be set, may be set to a null or zero value, or any other suitable step may be taken to store an indication that the second pseudorange measurement is not impaired. If the first pseudorange measurement is determined to be unimpaired, either because the difference did not exceed the first threshold or because the first pseudorange measurement is not greater than the second pseudorange measurement, the difference can be compared to a second threshold associated with the second transmitter 155. If the difference is greater than the second threshold and the second pseudorange measurement is larger than the first pseudorange measurement, the second signal was likely attenuated or delayed in some way. Accordingly, the flagging subsystem 125 may mark the second pseudorange measurement as impaired in such circumstances by, for example, storing the flag associated with the second signal and the second pseudorange measurement in memory 135, and in some embodiments, the calculated difference, or the calculated difference over the threshold, may be the flag value stored. In some embodiments, the flag may be considered a binary flag, and the flag value will be set either by setting the value to 1 (impaired) or to 0 (not impaired). If the calculated difference is not larger than the second threshold, or if the second pseudorange measurement is not larger than the first pseudorange measurement, the second flag associated with the second pseudorange measurement may not be set, may be set to a null or zero value, or any other suitable step may be taken to store an indication that the second pseudorange measurement is not impaired.

The flagging subsystem 125, as described above, may mark or flag the first pseudorange measurement as impaired, the second pseudorange measurement as impaired, or neither pseudorange measurement as impaired. In some embodiments, more than two signals may be received, each from a different transmitter on the same satellite. In such embodiments, the flagging subsystem 125 may compare each pseudorange measurement against each other pseudorange measurement in pairwise comparisons to identify all pseudorange measurements that may be impaired.

As indicated above, each transmitter of a satellite can have its own threshold associated with it. A mobile device can therefore apply a corresponding threshold to individually determine whether a measurement from a satellite is impaired, irrespective of whether another measurement from the same satellite has also been determined to be impaired. Additionally, as described below, in some embodiments a mobile device is configured to determine whether all the measurements from a satellite in a particular region of the sky are impaired. For example, as described below, the sky around a mobile device can be divided into different regions (e.g., quadrants) and, based on there being a threshold number of impaired measurements from different satellites in the same region, all the measurements from that region can be marked as impaired.

In some embodiments, flagging subsystem 125 may provide the pseudorange measurements and associated flags in a memory such as memory 135. Such information is depicted in an example table 300 of FIG. 3. In some embodiments, flagging subsystem 125 may store the pseudorange measurements and associated flags within a memory that may not be accessible to other applications, such as those executed by processor 140, unless such information is exposed via an application programming interface (API). In such embodiments, the flagging subsystem 125 may expose the pseudorange measurements, associated flags, and other data included in the example table 300 using an API. Alternatively, for each flag value, a corresponding uncertainty value may be calculated and exposed rather than the flag value itself. The uncertainty value represents an expected error level in a measurement. For example, if the uncertainty of a pseudorange is 10 meters, then the true pseudorange is the measured pseudorange plus or minus 10 meters. Uncertainty level can be calculated based on the signal level detected. An uncertainty value can also represent expected error level in a quantity calculated using a measurement. For instance, the uncertainty of position, time, and other types of values can be calculated by applying weights to measurements from which such values are calculated, where the weights are adjusted based on the uncertainty of corresponding measurements.

As discussed below, measurements that have been marked as impaired can be prevented from being used in a calculation (e.g., a position estimate). One way to prevent an impaired measurement from being used, or to at least have minimal weight in the calculation of some final result such as position or time, is to set the uncertainty value very high, for example to some maximum value such as a million meters. Another way is to apply some scaling or adjustment based on the level of impairment. For instance, if the pseudorange difference is above the threshold, the uncertainty can be set to a noise-based uncertainty plus an uncertainty determined from a difference between pseudorange measurements. As an example, if the noise-based uncertainty for a first pseudorange measurement is 10 meters (representing an uncertainty due to random noise in the signal level of the signal from which the first pseudorange measurement is calculated), the threshold for the transmitter associated with the first pseudorange measurement is 80 meters, and the pseudorange difference between the first pseudorange measurement and a second pseudorange measurement is 100 meters, then the uncertainty of the first pseudorange measurement can be set to 110 meters. Setting the uncertainty to a high value may cause the pseudorange measurement or the result of a calculation performed using the pseudorange measurement to be rejected. Other ways to calculate uncertainty values are possible.

In some embodiments, obtaining two signals transmitted on different carrier frequencies from the same satellite allows the user device 105 to calculate the ionospheric delay to get an ionosphere-free measurement. This works when there are two relatively unimpaired signals. Therefore, if the flagging subsystem 125 determines that neither of the two signals is impaired, the two unimpaired signals can be used to determine the ionospheric delay. In addition to flagging the impaired signals and associated pseudorange measurements, this ionospheric delay calculation may be used to enhance the information used to calculate the distances from the satellite and, in some embodiments, the satellite constellation with respect to future signals received. The ionosphere has different effects on signals transmitted at different frequencies. Therefore, the ionospheric delay determination will take into account the carrier frequency of the signal. Further, an ionosphere model may be developed to use for determining the ionospheric delay of signals from the satellite and satellite constellation in future calculations. In some embodiments, the ionospheric delay may be calculated or estimated periodically to ensure it is accurate. In some embodiments, the ionospheric delay calculation may use information from satellites at similar elevations to apply and generate a model of ionospheric delay based on elevation.

Another way to identify impaired signals besides comparing pseudorange measurements between different signals is to compare an expected ionospheric delay to an observed ionospheric delay. Accordingly, in some embodiments, an ionosphere model is applied to future signals to determine which of the signals do not fit the model, in which case the signal is deemed impaired. Upon such a determination, the flag value may be set to indicate the signal and associated pseudorange measurement is impaired. A general formula for estimating the ionospheric delay, $I_1$, corresponding to a first carrier frequency, using the first pseudorange measurement, $p_1$, corresponding to the first carrier frequency, the second pseudorange measurement, $p_2$, corresponding to the second carrier frequency, and the two carrier frequencies, $f_1$ and $f_2$, is as follows:

$$I_1 = \frac{f_2^2}{f_1^2 - f_2^2} * (p_2 - p_1)$$

Note that this formula assumes that all other carrier frequency dependent errors in the two pseudorange measurements are negligible or have been estimated and removed separately.

Position engine 130 may calculate the position (i.e., geographic location) of the user device 105 based on the pseudorange measurements stored in the memory 135 and the flags associated with each pseudorange measurement. For example, position engine 130 may use at least four pseudorange measurements to calculate the position of the user device 105. If at least four pseudorange measurements and the associated ephemeris data are available, position engine 130 can calculate the position of the user device 105. If there are pseudorange measurements with flags indicating the pseudorange measurement is impaired, the position engine 130 may not use those pseudorange measurements that are marked as impaired. However, there may not be sufficient pseudorange measurements available to calculate the position of the user device 105 without using impaired pseudorange measurements. In such cases, position engine may use the pseudorange measurements that appear to be least impaired, for example. The flag value may indicate an amount of impairment by providing the difference between the compared pseudorange measurements or the difference above the threshold between the pseudorange measurements, as described above. Accordingly, the position engine 130 may use the pseudorange measurements with the smallest flag values. In some embodiments, the position engine 130 may apply a higher weight value to the pseudorange measurements that are not impaired than to those pseudorange measurements that are impaired in the position calculation. In some embodiments, the weight of the pseudorange measurement in the position calculation (i.e., the calculation used to determine the position of the user device 105) may be weighted based on the amount of impairment determined based on the associated flag value. For example, if the flag value is very high (because the difference between the pseudorange measurements was large), the weight of the pseudorange measurement in the position calculation may be small while if the flag value is low, the weight of the pseudorange measurement may be large.

In some embodiments, the position engine 130 may use other information than the pseudorange measurements to calculate the position of the user device 105. Access points, base stations, and other network devices may provide information to the user device 105 that can be used to calculate the position of the user device 105. For example, if the position of an access point is known and the user device 105 receives a signal from the access point, the position engine 130 may use that information as one of the measurements for calculating its location.

Processor 140 may be any suitable processor for executing applications that may be stored on user device 105. Processor 140 may be any one or more of an application processor, a digital signal processor (DSP), a baseband processor, or the like, or any combination thereof. Applications that may be stored and executed on user device 105 may include navigation applications or other applications that may determine a position of the user device 105 and/or applications that may utilize a local clock, which may be included in clock subsystem 145 of the user device 105, for synchronous communication. One example of an application that may utilize synchronous communication includes vehicle applications for vehicle-to-vehicle (V2V) or vehicle-to-everything (V2X) communications. When synchronous communications are used, an accurate clock of the user device 105 is needed, and since clocks within typical user devices 105 are not consistently accurate (local clocks may be subject to drift), it takes only minutes or seconds for the local clock to start becoming inaccurate. Without periodic adjustments to keep the local clock synchronized to a shared time reference, the ability of the user device 105 to communicate synchronously with another device becomes difficult or even impossible if the time difference between the local clock of the user device 105 and the local clock of the other device is too large.

The applications executed by processor 140 may access the pseudorange measurement and associated flag information or uncertainty values using the application programming interface (API) discussed above that the flagging subsystem 125 may expose for use by other applications.

The clock subsystem 145 may include the local clock of the user device 105. Clock subsystem 145 may also include hardware, software, and/or firmware that access the pseudorange measurements and associated flag values and the position information from the position engine 130. Position Assistance Clock Estimation (PACE) is a way to determine the clock error when the position of the user device 105 is known. Ephemeris data and a pseudorange measurement and other information from the satellite signal may be used together with the known position of the user device 105 in order to calculate the clock error of the user device 105. The satellite signal includes time information, and the clocks within the satellites are far superior and are prone to substantially less error than the inexpensive quartz clocks often used in user devices 105. For this reason, the time information from within the satellite signal may be used with the known position of the user device 105 to calculate a clock error of the user device 105 clock. Clock subsystem 145 can calculate the clock error and adjust the clock of the user device to correct the clock. Clock correction can ensure that synchronous communication with other devices (e.g., other user devices 105 such as other mobile devices, vehicles, and the like) works properly. Synchronous communication with other devices when the clocks of the two devices are substantially different creates errors in the communication. In some cases, the synchronous communication fails because the timing requirements for the synchronous communication may not be met. In V2X communication, there are often tight requirements for the synchronous communication. The clock adjustments described here when the user device 105 is, for example, a vehicle, may allow for synchronous communications including V2X.

GNSS receiver 160 is capable of receiving signals from one or more GNSS satellites 110 using an antenna. Signals transmitted by transmitter 150 and transmitter 155 are received by the antenna and processed by GNSS receiver 160. The GNSS receiver 160 can extract a position of the user device 105, using conventional techniques of a GNSS system such as Global Positioning System (GPS), Galileo, Glonass, Quasi-Zenith Satellite System (QZSS) over Japan, Indian Regional Navigational Satellite System (IRNSS) over India, Beidou over China, and/or the like. GNSS receiver 160 can be GNSS receiver 980 as described with respect to FIG. 9.

Wireless receiver 165 can receive signals from one or more wireless transmitters. Wireless receiver 165 can be wireless communication interface 930 as described with respect to FIG. 9. Wireless receiver 165 may comprise separate transceivers to communicate with base stations (e.g., ng-eNBs and gNBs) and other terrestrial transceivers, such as wireless devices and access points. In some embodiments, user device 105 may use information received by wireless receiver 165 to calculate the position of the user device. The position information calculated using information received by wireless receiver 165 may be used to confirm the position calculation based on the satellite 110 signals. In some embodiments, the known position of the user device 105 may be used in combination with signals received by GNSS receiver 160 to calculate the clock error, as discussed above with respect to clock subsystem 145.

Server 115 may be any suitable computing device that may function as a server. Server 115 is depicted having processor 170, memory 180, and communication interface 175, although server 115 may have other components. Memory 180 may include long-term or short-term storage as well as memory containing instructions for execution by processor 170. Processor 170 may be processing units 1010 of FIG. 10, memory 180 may be storage devices 1025 and/or working memory 1035 of FIG. 10, and communication interface 175 may be wireless communications interface 1033 of FIG. 10. Server 115 may have information about the communication network of communication system 100 stored in the memory 180 that it may provide to user device 105 and/or receive from user device 105 via communication interface 175. For example, server 115 may provide ephemeris data to user device 105. In some embodiments, user device 105 may provide signal information received from transmitters 150 and 155, pseudorange measurements and flag values, and/or any other information to server 115. Server 115 may, in some embodiments, receive similar information from many user devices 105 and use the information to build a model of, for example, the atmospheric (ionospheric and tropospheric) delays for any given satellite or constellation of satellites. The model may be provided to the user devices 105 for use in the pseudorange subsystem 120 for calculating a more accurate pseudorange measurement for signals from satellites included in the model.

In use, the satellite 110 transmits multiple ranging signals from transmitter 150 and transmitter 155. The user device 105 receives the ranging signals and provides them to pseudorange subsystem 120. Pseudorange subsystem 120 calculates a pseudorange measurement for each signal using the information from the signal as well as, in some embodiments, model information from server 115 and ephemeris data, which may come from server 115, memory 135, or the signal itself. Pseudorange subsystem 120 may provide the pseudorange measurements to flagging subsystem 125. As discussed above, flagging subsystem 125 may calculate a difference between the pseudorange measurements and compare them to a first threshold associated with the first transmitter and/or a second threshold associated with the second transmitter. If the difference is larger than the first threshold (associated with the first transmitter 150 and first pseudorange measurement) and the first pseudorange measurement is larger than the second pseudorange measurement, the flagging subsystem 125 can mark the first pseudorange measurement as impaired. If the difference is larger than the second threshold (associated with the second transmitter 155 and second pseudorange measurement) and the second pseudorange measurement is larger than the first pseudorange measurement, the flagging subsystem 125 can mark the second pseudorange measurement as impaired. The flagging subsystem 125 can mark by, for example, setting a flag in memory 135 associated with the impaired pseudorange measurement.

The position engine 130, an application executing on processor 140, or clock subsystem 145 may use the pseudorange measurements and associated flags to calculate a position or clock adjustment for user device 105. In calculating the position or clock adjustment, a pseudorange measurement associated with a flag indicating impairment can be discarded or, in some embodiments, weighted so that it has a smaller impact on the calculation.

Figure 2:
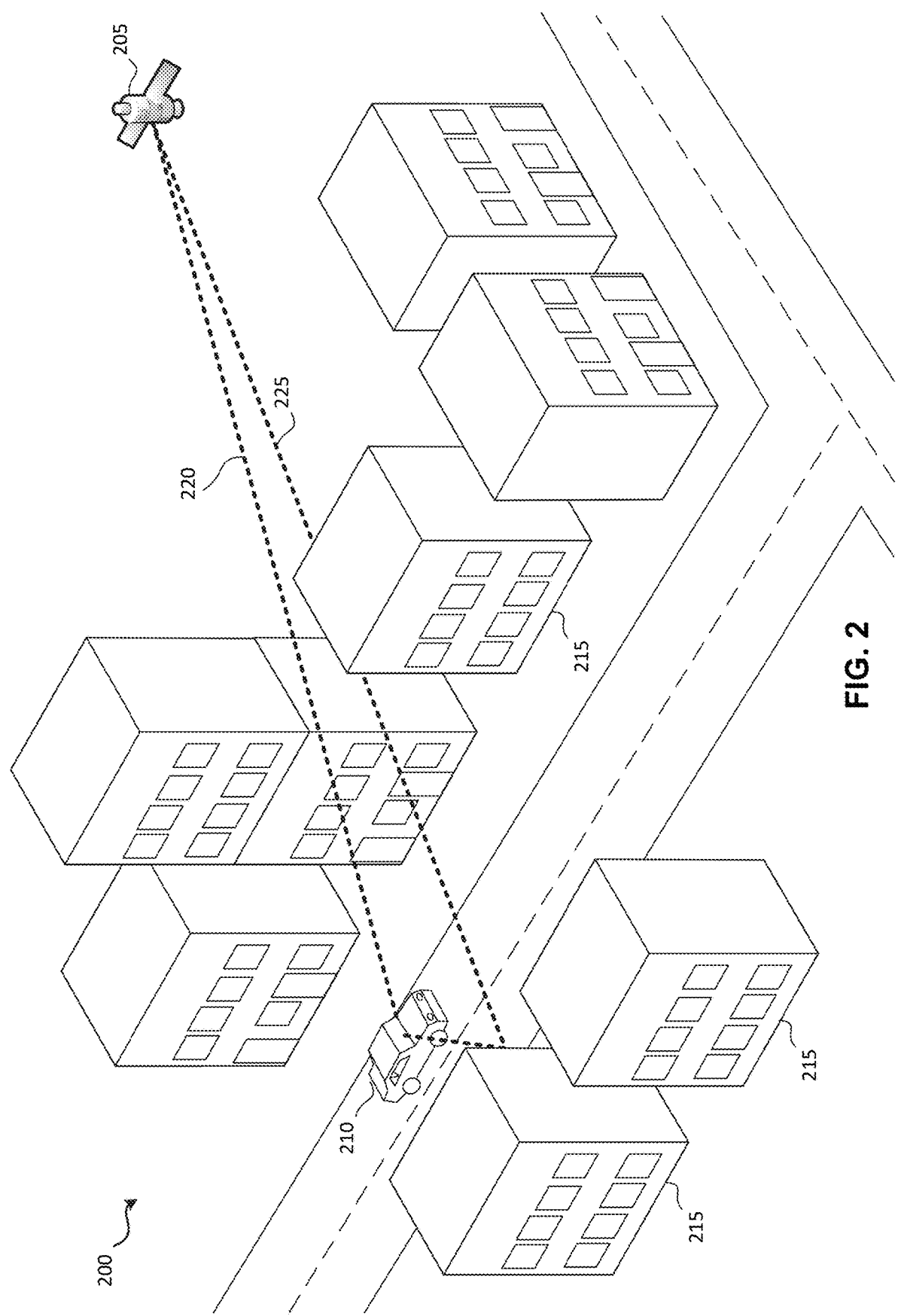
FIG. 2 is an example environment illustrating satellite signals.

FIG. 2 illustrates an exemplary diagram of a city streetscape 200 having a vehicle 210, buildings 215, and a satellite 205. As shown in FIG. 2, satellite 205 (which may be the same as satellite 110 of FIG. 1) can be configured to transmit two signals, which may be transmitted from differing transmitters (e.g. transmitter 150 and transmitter 155) having different transmission characteristics (e.g., different chiprates and/or the signals being sent with different modulation types and/or on different carrier frequencies), and those signals may follow separate signal paths (e.g., a first signal along a signal path 220 and a second signal along a signal path 225) to reach the vehicle 210. As shown, signal path 225 involves a reflection off a building 215 before the signal reaches the vehicle 210. Vehicle 210 may be a mobile device configured to perform a positioning operation using satellite signals (e.g., the user device of FIG. 1). Alternatively, a user within vehicle 210 may have a smartphone or other mobile device configured to perform positioning using satellite signals. Either vehicle 210 or a mobile device within vehicle 210 may have a receiver that receives the signals from signal paths 220 and 225 concurrently. The vehicle 210 or user device within vehicle 210 may calculate pseudorange measurements based on the two transmitted signals as described with respect to FIG. 1. Due to different signal characteristics (e.g., signal arrival time) and different processing techniques in the receiver (e.g., processing specific to the type of signal transmitted), the pseudorange measurements for the two transmitted signals may be different. For example, the pseudorange measurement for one signal may correspond to the length of signal path 220 while the pseudorange measurement for the other signal may correspond to the length of signal path 225.

Because the signal along signal path 225 is reflected, it may be substantially weaker than the signal along signal path 220 and/or take longer to reach the vehicle 210 due to increased travel distance. Therefore, a flagging subsystem of the mobile device or vehicle 210 may be used to determine that the pseudorange measurement for the second signal (along signal path 225) is impaired because the difference between the pseudorange measurements from the first signal (along signal path 220) and the second signal may be above a threshold associated with the second signal. The pseudorange measurement from the second signal is likely larger than the pseudorange measurement from the first signal. Assuming that the pseudorange from the second signal is larger and the difference between the two pseudorange measurements exceeds the threshold associated with the second signal, the pseudorange measurement from the second signal may be flagged as impaired, according to the technique discussed above with respect to FIG. 1.

FIG. 3 illustrates an example table 300 that may be stored, for example, in memory 135 of the user device 105 in FIG. 1. The table 300 includes information for the signals and pseudorange measurements that may be used and calculated by user device 105. For example, user device 105 may receive signals from many satellites including satellite 110. The satellite information, signal information, calculations based on the satellite and signal information, and other such information may be stored, at least temporarily, within user device 105. While table 300 provides an exemplary view of information, the table 300 may store additional, other, or less information than depicted in table 300.

Table 300 includes information for satellites 1, 2, 3, 4, and 5. Each satellite has two sets of information associated with it, indicating that each satellite transmitted two separate signals to the user device 105. In practice and in some embodiments, satellites may transmit more than two signals to the user device. In such embodiments, more than two entries for the satellite may appear in table 300. Table 300 includes a separate entry for each signal received. For each entry, table 300 includes a name of the satellite from which the signal was received, a pseudorange measurement calculated from the signal, the carrier frequency on which the signal was transmitted, the time at which the signal was transmitted, the difference between the pseudorange measurement of that signal and a second signal received concurrently from a different transmitter on the same satellite, a threshold value for the transmitter from which the signal was sent, and a flag value for the pseudorange measurement.

As an example, looking at the first entry in table 300, the signal was received from Sat 1. Based upon the information in the signal and other information available to the user device that received the signal, the user device calculated a pseudorange measurement of 23489263.4 meters. This is the calculated distance between the user device and Sat 1. The carrier frequency upon which the signal was transmitted was L1C. L1C is one example of a civilian ranging signal that is transmitted within the Global Positioning System (GPS) constellation operated by the United States. The signal was transmitted at time T1. The difference between the pseudorange measurement for the signal and the pseudorange measurement for a pairwise comparison signal entered in the second entry is 815.9 meters (23489263.4 minus 23488447.5 equals 815.9). The signal associated with the first entry and the signal associated with the second entry are related, and their measurements can be compared because they each originated from the same satellite and were transmitted on different carrier frequencies at the same time. The threshold for the transmitter that transmitted the signal of the first entry is 62 meters. This threshold may be a fixed value and may be stored, for example, in memory 135 of FIG. 1. In some embodiments, a table of threshold values may be stored for the given satellites upon which the user device relies. In some embodiments, the threshold value is a single fixed value. In some embodiments, the chiprate, modulation type, and carrier frequency can be used to calculate the threshold value. In some embodiments, the threshold value may be different depending on, for example, the satellite's location because depending upon the amount of atmosphere the signal must travel through it may experience differing effects from the ionosphere and troposphere. In some embodiments, the receiver (user device) may detect the signal as weak, and may use a larger threshold than a threshold used when the signal is stronger because there may be more noise in the weaker signal. In some embodiments, there may be multiple threshold values stored for each transmitter that may be selected based on the location of the satellite, the carrier frequency used by the transmitter, the modulation type used by the transmitter, and so forth. The threshold values may also be selected heuristically based on field data analysis. The flag value stored for the first signal is 753.9 meters, which corresponds to the extent to which the difference between the pseudorange measurements of the first and second entries exceeds the threshold value for the first entry (815.9 minus 62 equals 753.9). Therefore, the flag value indicates an amount of impairment of the pseudorange measurement. In the example of the first entry, the impairment is great enough that it may have a substantial impact on the accuracy of a position calculation using this pseudorange measurement. While a flag value of 1 (i.e., a binary true/false value) may be used, providing the value of the difference can give an indication of how impaired the signal may be.

As shown in table 300, the signals from each satellite that transmit at substantially the same time are compared pairwise to identify which of the signals may be impaired. While exactly matching time transmissions may not happen due to inter-signal clock biases in the satellite, signals that transmit at substantially the same time (e.g., within a few nanoseconds of each other) may be sufficiently close to compare their corresponding pseudorange measurements.

As shown in table 300, the signals from Sat 2 each result in a pseudorange measurement that is very close to the same distance, having a difference of only 7.6 meters. Since the difference of 7.6 is below the threshold values for both signals, both the pseudorange measurements have flag values of 0, indicating neither one is impaired.

The signals from Sat 3 do not result in a large pseudorange difference, however the difference is nonetheless above the threshold of 28 meters for the signal resulting in the larger pseudorange measurement, leaving a flag value of 2.5. Compared to the flag value of 753.9 for the first entry in table 300, the flag value of 2.5 indicates that the pseudorange measurement for this signal from Sat 3 is only slightly impaired. As discussed previously, the weighting used in position calculations may be used to compensate for such low impairments versus the high impairment of the signal of the first entry in the table 300.

Figure 4:
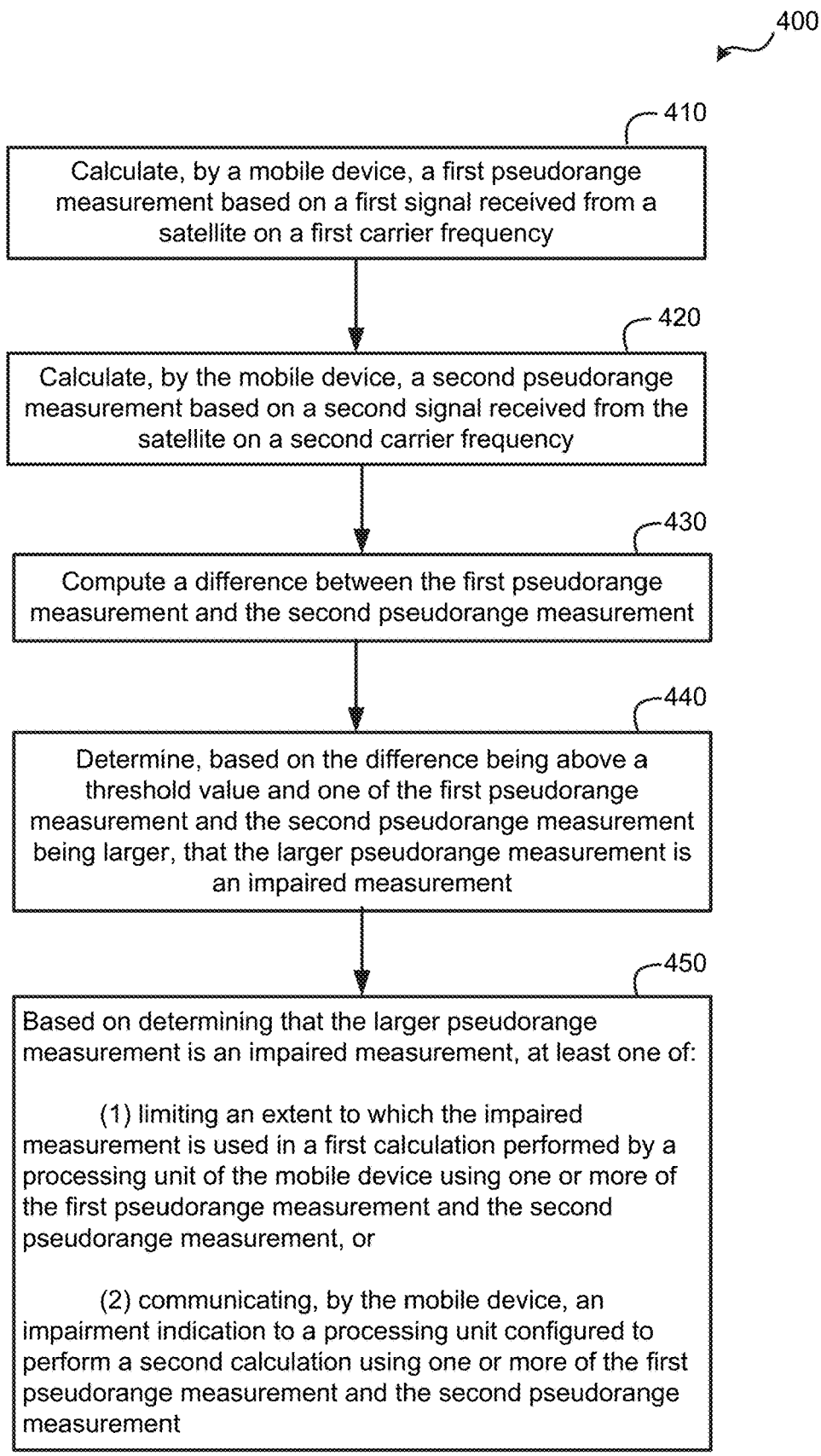
FIG. 4 is a flow diagram of a method of identifying impaired signals according to an embodiment.

FIG. 4 is a flow diagram of a method 400 for mitigating errors based on attenuation or multipath of the received signals. Alternative embodiments may vary in function by combining, separating, or otherwise varying the functionality described in the blocks illustrated in FIG. 4. The method 400 can be performed by a mobile device such as the user device 105 in FIG. 1 or UE 900 in FIG. 9. Means for performing the functionality of one or more of the blocks illustrated in FIG. 4 may further comprise hardware and/or software components of a computer system, such as the computer system 1000 illustrated in FIG. 10 and described in more detail below. For example, the functionality of each of the blocks in FIG. 4 can be performed using a bus 1005, processing unit(s) 1010, memory 1035, communication subsystem 1030, and/or other software and/or hardware components of computer system 1000.

At block 410, a first pseudorange measurement is calculated by a mobile device based on a first signal received from a satellite on a first carrier frequency. The first pseudorange measurement may be calculated by pseudorange subsystem 120 of FIG. 1. The first pseudorange measurement may be calculated based on information within the received signal including a timestamp of when the signal was transmitted, the carrier frequency and modulation type of the signal, which may be impacted by atmospheric effects differently than signals at other frequencies, and the like. The first pseudorange measurement provides an estimated distance between the user device that received the signal and the satellite that transmitted the signal at the time the signal was received.

At block 420, a second pseudorange measurement is calculated by the mobile device based on a second signal received from the satellite on a second carrier frequency. The second pseudorange measurement may be calculated much like the first pseudorange measurement is calculated, e.g., by the pseudorange subsystem 120. However, the second pseudorange measurement will have different characteristics used to complete the calculation. The second pseudorange measurement provides an estimated distance between the user device that received the second signal and the satellite that transmitted the second signal at the time the second signal was received.

At block 430, a difference is computed between the first pseudorange measurement and the second pseudorange measurement. The difference may be calculated by, for example, flagging subsystem 125 of FIG. 1. The difference may be calculated by subtracting the first pseudorange measurement from the second pseudorange measurement. While the absolute magnitude of the difference is depicted in the table 300 of FIG. 3, the signed value of the difference can be used when comparing to the threshold values.

At block 440, a determination is made, based on the difference being above a threshold value and one of the first pseudorange measurement and the second pseudorange measurement being larger, that the larger pseudorange measurement is an impaired measurement. As part of determining that the larger pseudorange measurement is an impaired measurement, a flag associated with the impaired measurement can be set to a value indicating impairment or degree of impairment. As discussed above, a separate threshold can be applied to each pseudorange measurement from a particular signal. Accordingly, block 440 can potentially be repeated to determine that the smaller pseudorange measurement is also impaired. Alternatively, it may happen that the result of the processing in block 440 as applied to the smaller pseudorange measurement indicates the smaller pseudorange measurement is not impaired.

At block 450, based on determining that the larger pseudorange measurement is an impaired measurement, one or more of the following can be performed: (1) limiting an extent to which the impaired measurement is used in a first calculation performed by a processing unit of the mobile device using one or more of the first pseudorange measurement and the second pseudorange measurement, or (2) communicating, by the mobile device, an impairment indication to a processing unit configured to perform a second calculation using one or more of the first pseudorange measurement and the second pseudorange measurement.

Steps (1) and/or (2) in block 450 can be performed using a flag value set to indicate an impaired measurement. For example, if the flag value associated with the first pseudorange measurement is set to indicate that the first pseudorange measurement is impaired, then use of the first pseudorange measurement in a position estimate can be limited, either by excluding the first pseudorange measurement entirely or by weighting the first pseudorange measurement according to the extent to which the first pseudorange measurement is impaired (e.g., the amount by which the pseudorange difference exceeds the threshold, as shown in FIG. 3).

The communication of the impairment indication in (2) may involve communicating the flag value that has been set to indicate an impaired measurement and may involve internal communication (e.g., between two applications executing on the same processor or on different processors of the mobile device) or external communication (e.g., between the mobile device and a remote device such as a location server). In some instances, the internal or external communication may occur after writing the flag value to a memory of the mobile device, e.g., in a log file for subsequent processing. Thus, the processing unit that receives the impairment indication can be a processing unit of the mobile device or a processing unit of the remote device. In some instances, the processing unit that receives the impairment indication may initiate the communication of the impairment indication (e.g., by making a read request to the log file stored in the memory of the mobile device). Further, as discussed earlier, in some embodiments, an uncertainty value may be communicated instead of a flag value. Upon receiving the impairment indication, the processing unit can take the impairment into consideration during the second calculation. For example, the second calculation in (2) can be the same as the first calculation in (1), and the processing unit can limit the extent to which the impaired measurement is used in the second calculation.

The communication of the impairment indication in (2) can involve communication between the mobile device and a remote device, for example, a device on a network such as a location server. As another example, the impairment indication can be communicated to another mobile device. For instance, the mobile device that calculates the first pseudorange measurement and the second pseudorange measurement can be a smartwatch, headset, or other wearable device that collects measurements and sends the collected measurements to a mobile phone for calculating, at the mobile phone, the position of the smartwatch/headset/wearable device.

In addition or as an alternative to communicating the impairment indication, the mobile device can decide whether to forward the impaired measurement to the processing unit that performs the second calculation (e.g., a processor of the mobile phone or other remote device). In some embodiments, all measurements are communicated irrespective of impairment, and the remote device will decide based on impairment indications whether to use impaired measurements. In other embodiments, impaired signals may not be communicated to the remote device, or only a subset of impaired signals (e.g., the least impaired) are communicated to the remote device for processing. As indicated in the previously described embodiments, the method 400 may include any of a variety of additional features, depending on desired functionality. For example, in some embodiments a position of the user device may be calculated based on the calculated pseudorange measurements and the associated flag values. However, pseudorange measurement can be used for calculating other quantities besides position. As indicated above, such measurements may be used to provide a precise timing reference, detect ionospheric patterns, etc. and such calculations may be performed in addition to or instead of a position calculation.

Figure 5A:
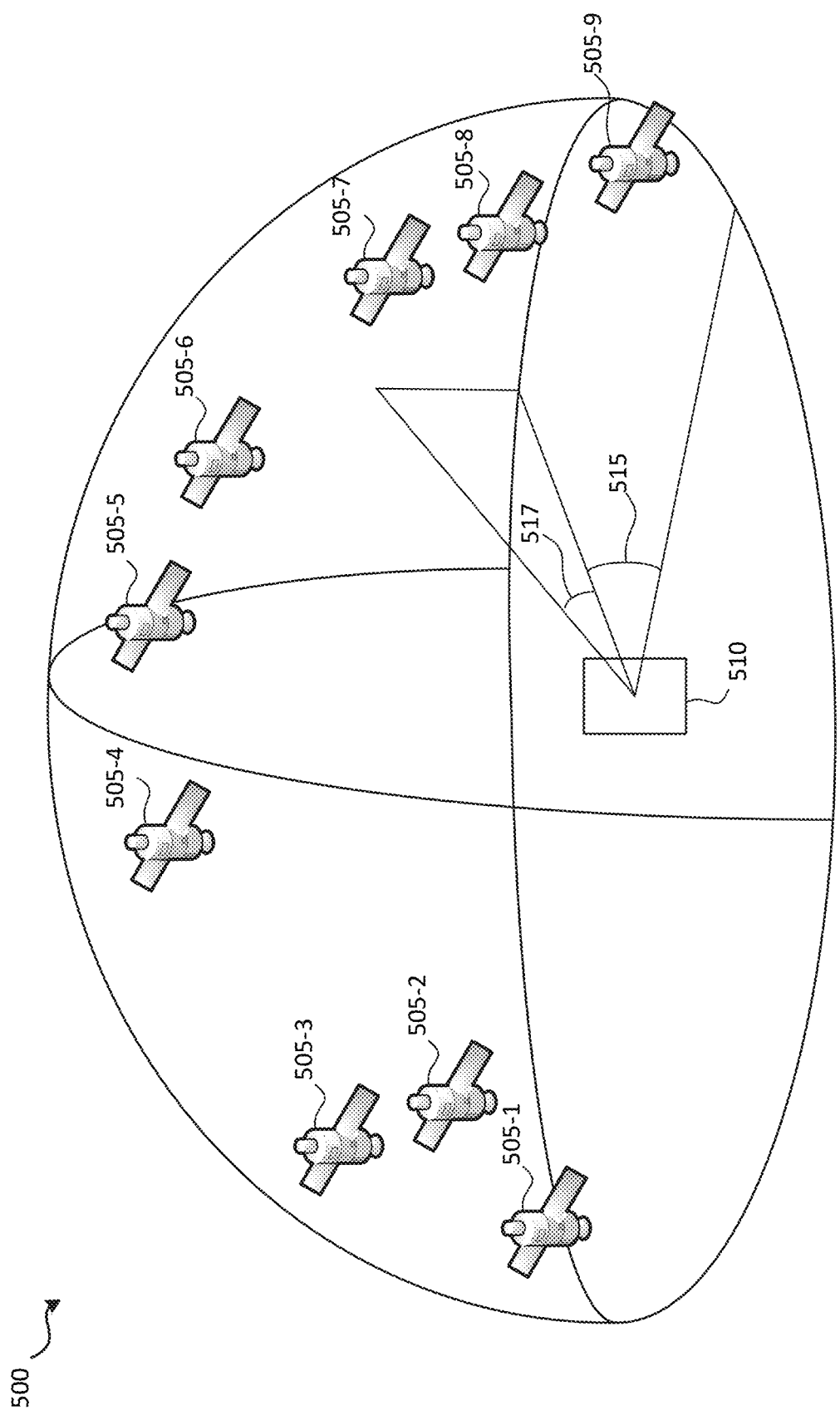
FIGS. 5A and 5B show an example division of the sky around a mobile device into different regions, according to an embodiment.
Figure 5B:
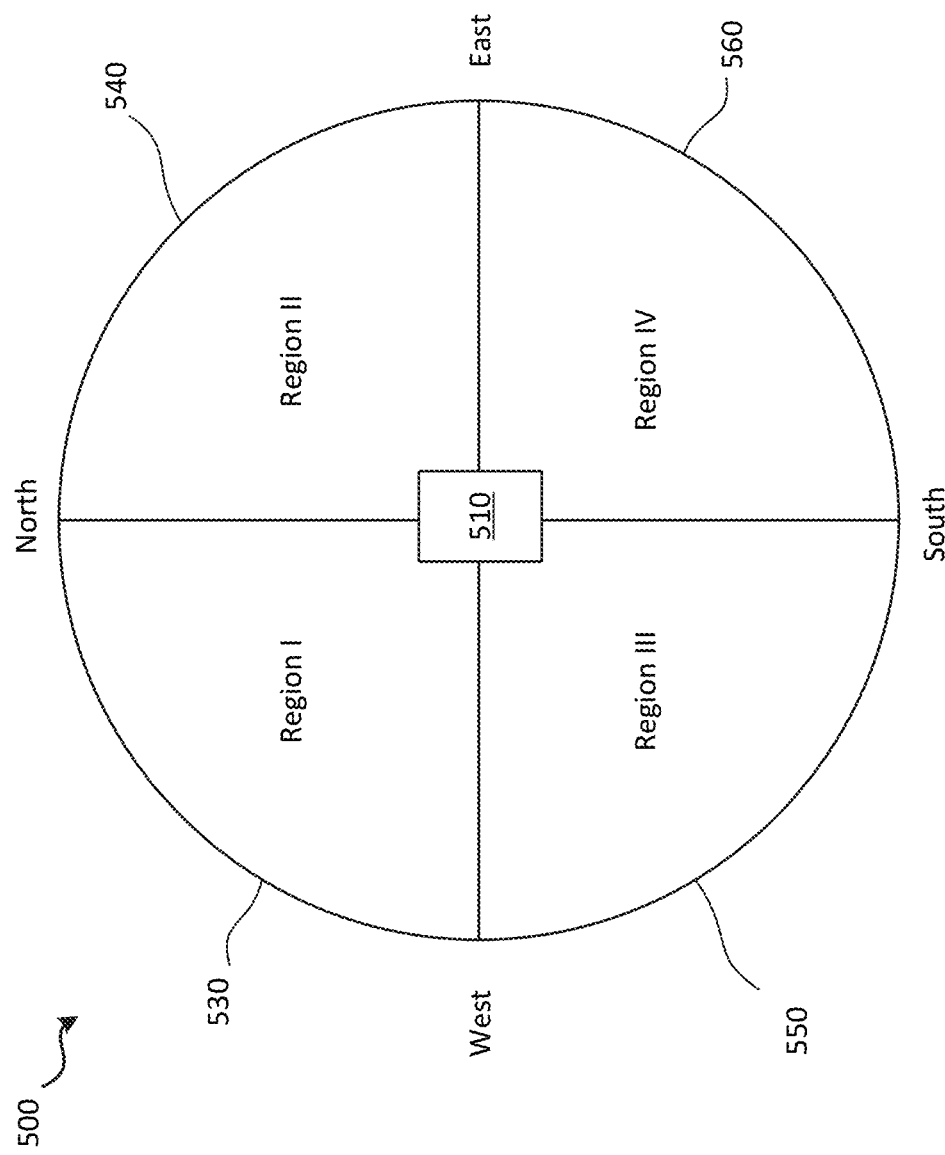

FIGS. 5A and 5B show an example division of the sky 500 around a mobile device 510 into different regions, according to an embodiment. FIG. 5A is a perspective view of the sky 500 within the field of view of mobile device 510. As shown in FIG. 5A, the sky 500 can be divided into multiple regions. Each region can span a range of azimuth angles 515 and/or a range of elevation angles 517. For example, as shown in FIG. 5B, the sky 500 can be divided into four quadrants 530, 540, 550, and 560 based on the cardinal directions. FIG. 5B is a top view of the sky 500 showing how the four quadrants can be divided into uniform regions, each region covering a quarter of the azimuth angles. However, other divisions of the sky are possible. In other embodiments, the sky may be divided into more or fewer regions.

Mobile device 510 may correspond to any of the mobile devices described above, such as user device 105 in FIG. 1. Mobile device 510 can be configured to maintain a digital map of the sky 500, e.g., in an internal memory. As shown in FIG. 5A, satellites 505-1 to 505-9 may be distributed across different regions of the sky. The number of satellites in a given region at any given time can vary, as satellites are in constant motion. Satellites within the same region can form a constellation, and each satellite can be configured to transmit multiple signals on different carriers. The digital map maintained by the mobile device 510 can indicate which satellite signals are impaired. For instance, mobile device 510 can continuously update the digital map to track the locations of any satellites associated with impaired pseudorange measurements. The digital map can be updated after every measurement period or epoch but may be updated less frequently. Additionally, as discussed below in reference to FIG. 6, the digital map can be analyzed to identify situations in which there is sufficient impairment within a particular region that all measurements from the particular region should be marked as impaired.

Figure 6:
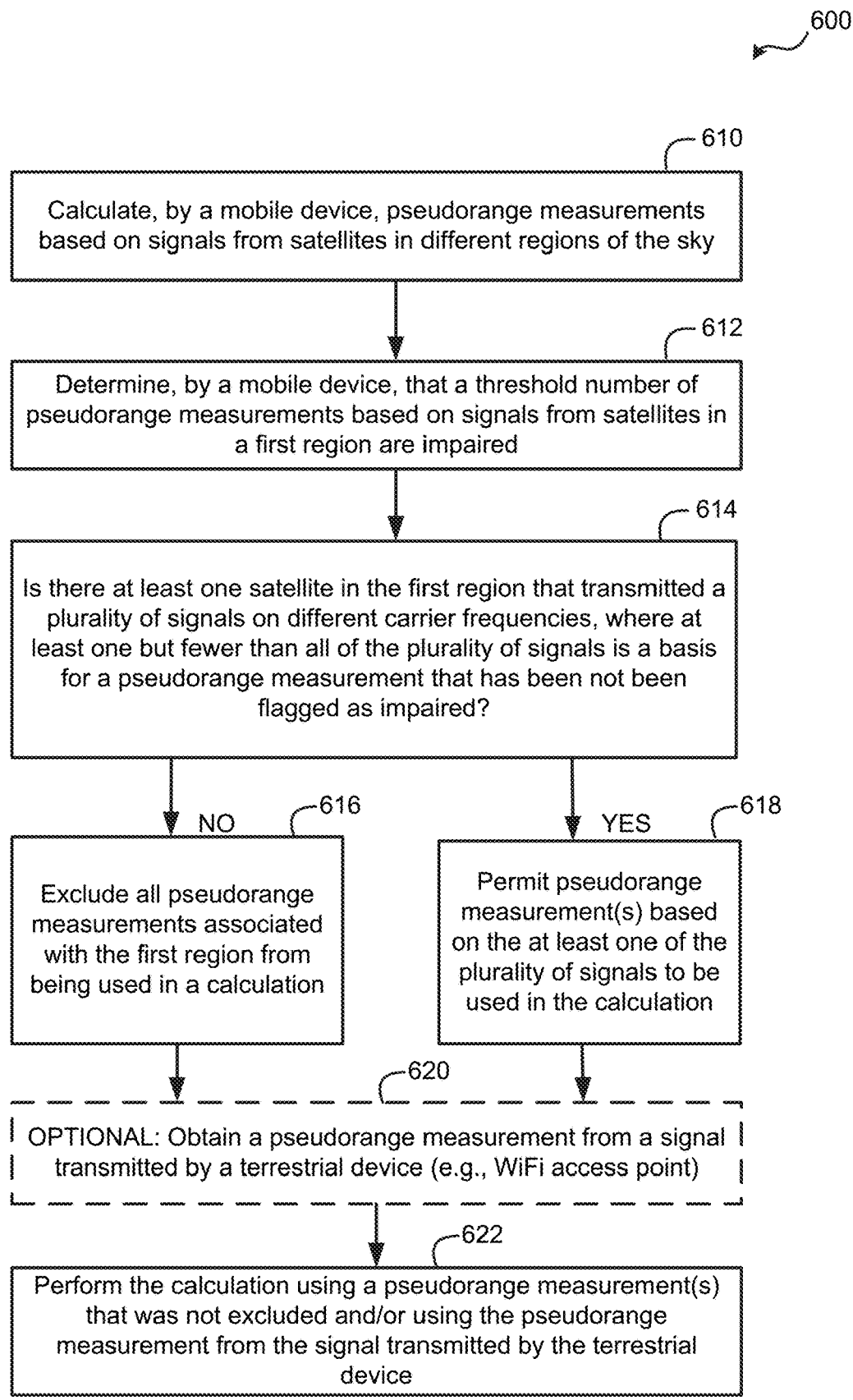
FIG. 6 is a flow diagram of a method of identifying impaired signals in different regions of the sky, according to an embodiment.

FIG. 6 is a flow diagram of a method 600 of identifying impaired signals in different regions of the sky, according to an embodiment. Alternative embodiments may vary in function by combining, separating, or otherwise varying the functionality described in the blocks illustrated in FIG. 6. The method 600 can be performed by a mobile device such as the user device 105 in FIG. 1 or the UE 900 in FIG. 9. Means for performing the functionality of one or more of the blocks illustrated in FIG. 6 may further comprise hardware and/or software components of a computer system, such as the computer system 1000 illustrated in FIG. 10. For example, the functionality of each of the blocks in FIG. 6 can be performed using a bus 1005, processing unit(s) 1010, memory 1035, communication subsystem 1030, and/or other software and/or hardware components of computer system 1000.

At block 610, a mobile device calculates pseudorange measurements based on signals from satellites in different regions of the sky. The calculation of the pseudorange measurements in 610 can be performed using the pseudorange subsystem 120 and in the same manner as discussed above. Usually, each satellite is configured to transmit multiple signals on different carriers, similar to the situation depicted in FIG. 1. However, due to multipath loss, blockages, and other factors, not every signal transmitted by a satellite may be received by the mobile device. In some instances, the mobile device may not receive any signals from a particular satellite.

At block 612, the mobile device determines that a threshold number of pseudorange measurements based on signals from satellites in a first region (e.g., any one of the regions 530, 540, 550, and 560) are impaired. The determination in 612 can be performed by the flagging subsystem 125 and can be based on a fixed or dynamic threshold. For instance, the threshold can be a percentage of the total number of satellites that are expected to be presently visible in the first region as indicated by an almanac. Alternatively, the threshold can be a fixed number. Impairment can be determined using any of the methods described above, such as the method depicted in FIG. 4. For example, the processing in 612 may involve calculating a pseudorange difference for each unique pair of signals from any particular satellite in the first region, then comparing the pseudorange difference to a threshold to determine whether a pseudorange measurement associated with one of the signals in the pair of signals is impaired.

Blocks 614, 616, and 618 can be performed by flagging subsystem 125. At block 614, a determination is made whether there is at least one satellite in the first region that transmitted a plurality of signals on different carrier frequencies, where at least one but fewer than all of the plurality of signals is a basis for a pseudorange measurement that has been not been flagged as impaired. If there are no satellites in the first region that meet these criteria, then the result of determination in 614 is negative, and the method proceeds to block 616. However, if there is at least one satellite that meets the criteria, i.e., some but not all of the signals from the satellite have yet to be flagged as impaired, then the result of the determination in 614 is positive, and the method proceeds to 618.

At block 616, all pseudorange measurements associated with the first region are excluded from being used in a calculation (e.g., a position estimate). The exclusion in 616 covers all satellites in the first region and every type of positioning reference signal irrespective of carrier frequency. The exclusion in block 616 can be performed, for example, by setting the values of flags associated with satellites in the first region to indicate impairment even though such flagging may not have occurred during the initial impairment determination in block 612. Further, as with block 450 of FIG. 4, an impaired signal does not have to be excluded completely but can instead be weighted so as to contribute less to a calculation using the impaired signal. According, pseudorange measurements associated with the first region can simply be de-weighted.

At block 618, any pseudorange measurements based on the at least one of the plurality of signals that satisfied the criteria in block 614 are permitted to be used in the calculation. Applying the criteria in block 614 creates certain exceptions to the exclusion in block 616 of all pseudorange measurements associated with the first region. Specifically, the exceptions cover situations in which it can reasonably be determined that there is an unimpaired signal even though that signal was transmitted by a satellite in a region where most of the signals are impaired. To qualify for an exception, a plurality of signals must have been transmitted by the same satellite on different carrier frequencies and received by the mobile device. This means that if the mobile device only received one signal, then any pseudorange measurements from the one signal will be excluded since there is no basis for comparing to another pseudorange measurement in order to determine whether the pseudorange measurement from the one signal is impaired or not.

Assuming a plurality of signals have been received from the same satellite, there should be at least one signal among the plurality of signals with a pseudorange measurement that has not been flagged as impaired. However, if every pseudorange measurement from the same satellite has not been marked as impaired, then every one of these pseudorange measurements should be excluded despite not having been marked impaired. The rationale for this exclusion is that when no measurements from the same satellite have been marked impaired, this could be due to the measurements genuinely being unimpaired, or it could be due to the measurements being impaired in similar ways. For example, if a satellite in the first region transmits a signal in the L1 band and a signal in the L5 band, but the pseudorange difference between both signals does not conclusively indicate that the pseudorange measurement for either signal (L1 or L5) is impaired, then there is a distinct possibility that the pseudorange measurements for both signals (L1 and L5) are impaired. As a precaution, it is preferable that no exception be made in such situations.

The functionality depicted in block 620 is optional. At block 620, a pseudorange measurement from a signal transmitted by a terrestrial device is obtained. The functionality of block 620 can be performed by wireless receiver 165, for example, based on communications with a WiFi access point. However, the terrestrial device can be any networked device in wired or wireless communication with the mobile device and configured to serve as an alternative source of pseudorange measurements. The pseudorange measurement in block 620 can be obtained in response to the mobile device determining that there is an insufficient number of unimpaired pseudorange measurements to perform a position estimate of other calculation. Alternatively, the mobile device may obtain the pseudorange measurement in block 620 in response to identifying a degradation in the accuracy of the position estimate or other calculation. For example, if the mobile device is indoors and the position estimate shows the mobile device moving toward a window of a building (because satellite signals can more easily reach the mobile device through the window) and then moving outside of the building even though the mobile device has remained inside, the mobile device can incorporate a WiFi based pseudorange measurement to correct the position estimate.

The functionality depicted in blocks 612 to 618 can be repeated in order to determine whether to exclude any pseudorange measurements associated with other regions besides the first region. Thus, for each region in the different regions, a determination can be made as to whether to exclude some or all of the pseudorange measurements that were calculated based on signals from the region.

At block 622, a calculation (e.g., position estimate) is performed using any pseudorange measurements that were not excluded based on blocks 616 and 618. Such remaining pseudorange measurements can be associated with different regions. However, as a result of the processing in block 616 or 618, the remaining pseudorange measurements will include fewer than all of the pseudorange measurements calculated for the first region in block 610. Additionally or alternatively, the calculation in 622 can be performed using the pseudorange measurement obtained in block 620, in which case the calculation in 622 can combine the pseudorange measurement from block 620 with unimpaired and/or least impaired pseudorange measurements from satellite signals. The calculation in 622 can be performed by position engine 130 and/or processor 140. When performed by UE 900 in FIG. 9, the calculation in 622 can be performed by processing unit(s) 910 and/or DSP 920.

Figure 7:
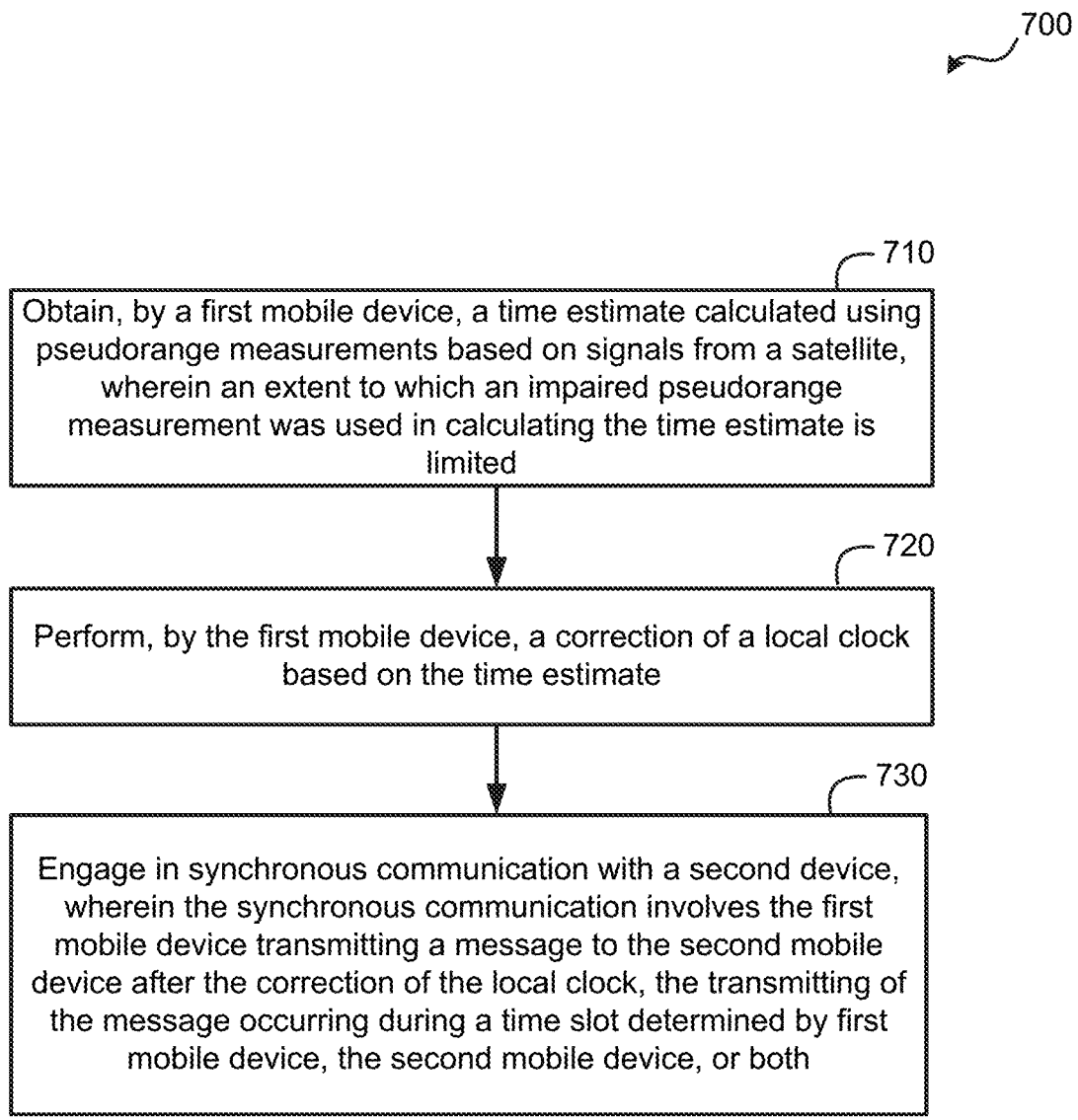
FIG. 7 is a flow diagram of a method of synchronous communication, according to an embodiment.

FIG. 7 is a flow diagram of a method 700 of synchronous communication, according to an embodiment. Alternative embodiments may vary in function by combining, separating, or otherwise varying the functionality described in the blocks illustrated in FIG. 7. The method 700 can be performed by a mobile device such as the user device 105 in FIG. 1 or the UE 900 in FIG. 9. In the embodiment of FIG. 7, a first mobile device engages in synchronous communication with a second device, which can also be a mobile device. The first mobile device and the second mobile device may, for example, be onboard motor vehicles and communicate with each other according to a V2V or V2X communications protocol. Means for performing the functionality of one or more of the blocks illustrated in FIG. 7 may further comprise hardware and/or software components of a computer system, such as the computer system 1000 illustrated in FIG. 10. For example, the functionality of each of the blocks in FIG. 7 can be performed using a bus 1005, processing unit(s) 1010, memory 1035, communication subsystem 1030, and/or other software and/or hardware components of computer system 1000.

At block 710, a first mobile device obtains a time estimate which was calculated using pseudorange measurements based on signals from a satellite. Depending on the number of pseudorange measurements available, both position and time may be calculated. For example, four or more pseudorange measurements are usually sufficient to estimate position in addition to time. If less than four pseudorange measurements are available, time can still be estimated based on a last known position (e.g., a most recent position estimate). Thus, the time estimate in block 710 may be computed jointly with a position estimate using pseudorange measurements. Alternatively, the time estimate in 710 may be computed independently of computing position, using a known position along with pseudorange measurements. The time estimate may have been calculated remotely (e.g., by a location server). Alternatively, the time estimate may have been calculated by the first mobile device itself. Further, an extent to which an impaired pseudorange measurement was used in calculating the time estimate is limited, for example, according to the method of FIG. 4. Thus, the time estimate obtained in 710 can be an estimate that reflects a result of flagging a pseudorange measurement as impaired and then performing some remedial action (e.g., exclusion, correction, or weighting) to minimize the adverse influence of the impaired pseudorange measurement on the time estimate.

At block 720, the first mobile device performs a correction of a local clock (e.g., a clock in the clock subsystem 145) based on the time estimate obtained in 710. Here, since the time estimate in 710 was obtained as a result of limiting an impaired pseudorange measurement, the accuracy of the time estimate is improved and, consequently, so is the accuracy of the calculated clock error.

At block 730, the first mobile device engages in synchronous communication with a second device. As mentioned above, the second device can also be a mobile device and, in some embodiments, both mobile devices are onboard respective vehicles that communicate using V2V of V2X messages. The synchronous communication in block 730 may include the first mobile device transmitting a message to the second mobile device after the correction of the local clock, the transmitting of the message occurring during a time slot determined by first mobile device, the second mobile device, or both. For example, the first mobile device can use its corrected local clock to determine when a time slot assigned to the first mobile device for transmitting a V2V or V2X message is about to occur. The synchronous communication in block 730 may also include tuning a receiver of the first mobile device to listen for or decode messages from the second device during a time slot assigned to the second device.

The time slot can be determined before or after the correction of the local clock in block 720. For instance, the first mobile device can request a specific time slot and receive an acknowledgement from the second device confirming the requested time slot, and the position estimate in 710 can be obtained based on pseudorange measurements received by the first mobile device after receiving the acknowledgement. As another example, the first mobile device can correct its local clock before engaging in a discovery process whereby the first mobile device negotiates a time slot for itself after becoming aware of the presence of the second device. The time slots assigned to the first mobile device and the second device can be non-overlapping, and messages between the first mobile device and the second device can be multiplexed, for example, using time-division multiplexing, frequency-division multiplexing, or both.

Figure 8:
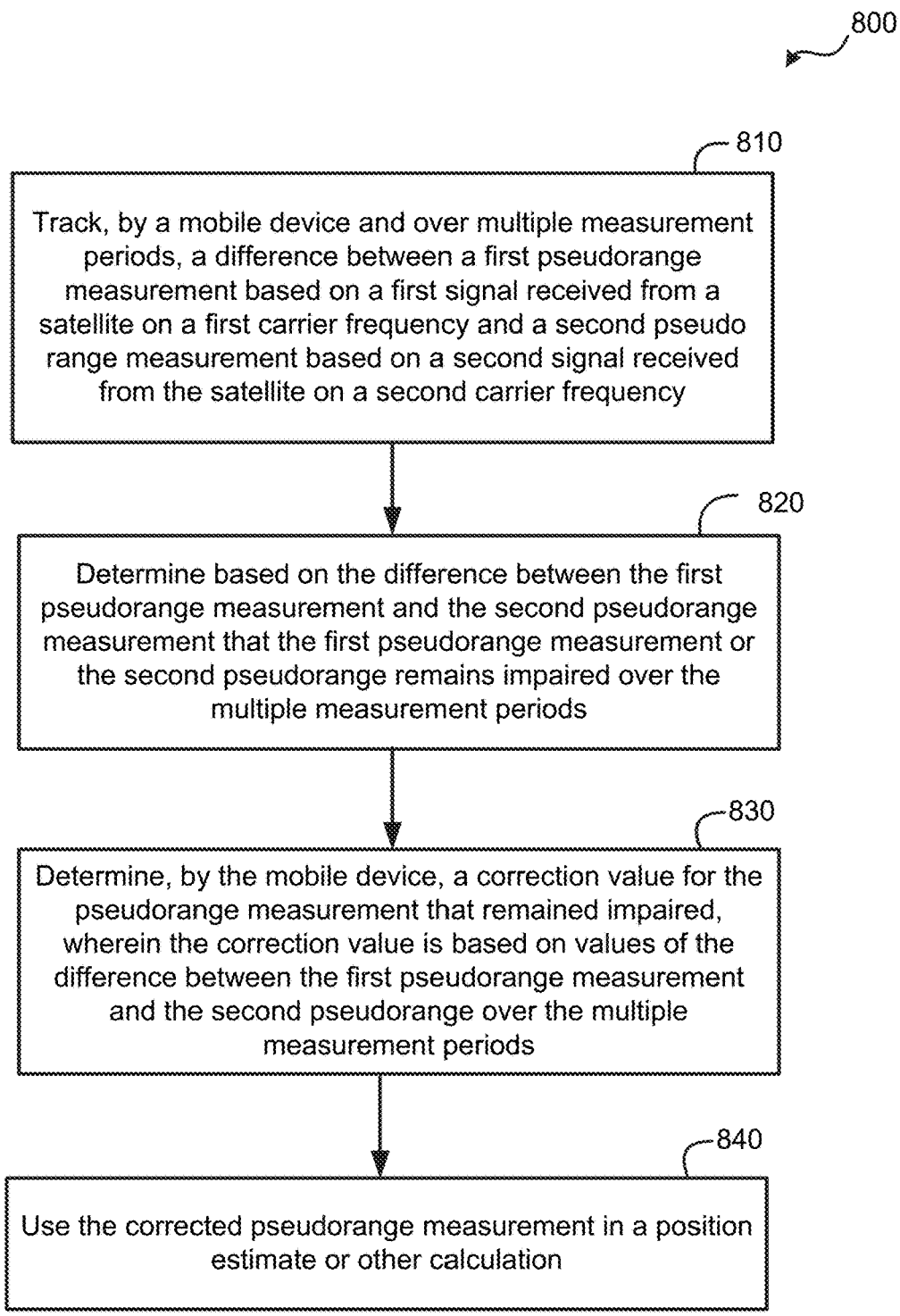
FIG. 8 is a flow diagram of a method of correcting an impaired measurement, according to an embodiment.

FIG. 8 is a flow diagram of a method 800 of correcting an impaired measurement, according to an embodiment. Alternative embodiments may vary in function by combining, separating, or otherwise varying the functionality described in the blocks illustrated in FIG. 8. The method 800 can be performed by a mobile device such as the user device 105 in FIG. 1 or the UE 900 in FIG. 9. Means for performing the functionality of one or more of the blocks illustrated in FIG. 8 may further comprise hardware and/or software components of a computer system, such as the computer system 1000 illustrated in FIG. 10. For example, the functionality of each of the blocks in FIG. 8 can be performed using a bus 1005, processing unit(s) 1010, memory 1035, communication subsystem 1030, and/or other software and/or hardware components of computer system 1000.

At block 810, a mobile device tracks a difference between a first pseudorange measurement based on a first signal received from a satellite on a first carrier frequency and a second pseudo range measurement based on a second signal received from the satellite on a second carrier frequency. The tracking can be performed over multiple measurement periods, for example, a set of measurement periods sufficient to obtain three or more pseudorange measurements for each of the first signal and the second signal. In practice, the duration of the multiple measurement periods is relatively short (e.g., several seconds to one minute, depending on the measurement rate) since the pseudorange measurements have a limited useful lifespan before they become stale due to movement of the satellite and/or movement of the mobile device.

At block 820, a determination is made based on the difference between the first pseudorange measurement and the second pseudorange measurement that the first pseudorange measurement or the second pseudorange remains impaired over the multiple measurement periods. For instance, the mobile device may recognize that over the multiple measurement periods, either the first pseudorange measurement or the second pseudorange measurement is continuously impaired based on the criteria discussed above in reference to FIG. 3.

At block 830, the mobile device determines a correction value for the pseudorange measurement that remained impaired over the multiple measurement periods. The correction value is based on values of the difference between the first pseudorange measurement and the second pseudorange over the multiple measurement periods. For instance, the correction value can be a time average of the pseudorange difference over the course of the multiple measurement periods. Averaging works well if the pseudorange difference remains relatively constant over the multiple measurement periods. Averaging is therefore useful for making short term corrections over durations where the relationship between a pair of signals from a satellite is stable. As an alternative to averaging, the mobile device may predict the correction value based on a trend or pattern of the pseudorange difference over the multiple measurement periods. The prediction can be performed, for example, by fitting a mathematical function to the pseudorange difference in order to extrapolate the value of the pseudorange difference at a subsequent measurement period. In some embodiments, pseudorange measurements may be input to a predictive filter (e.g., a Kalman filter) to estimate the correction value.

At block 840, the pseudorange measurement that was correction in block 830 is used in a position estimate or other calculation. Because the pseudorange measurement has been adjusted up or down according to the correction value, the pseudorange measurement is less impaired compared to its uncorrected value. Therefore, the correction enables the pseudorange measurement to be used in a calculation. This can be useful in situations where there are insufficient number of unimpaired pseudorange measurements and pseudorange measurements from alternative sources (e.g., a WiFi access point) are not available.

Figure 9:
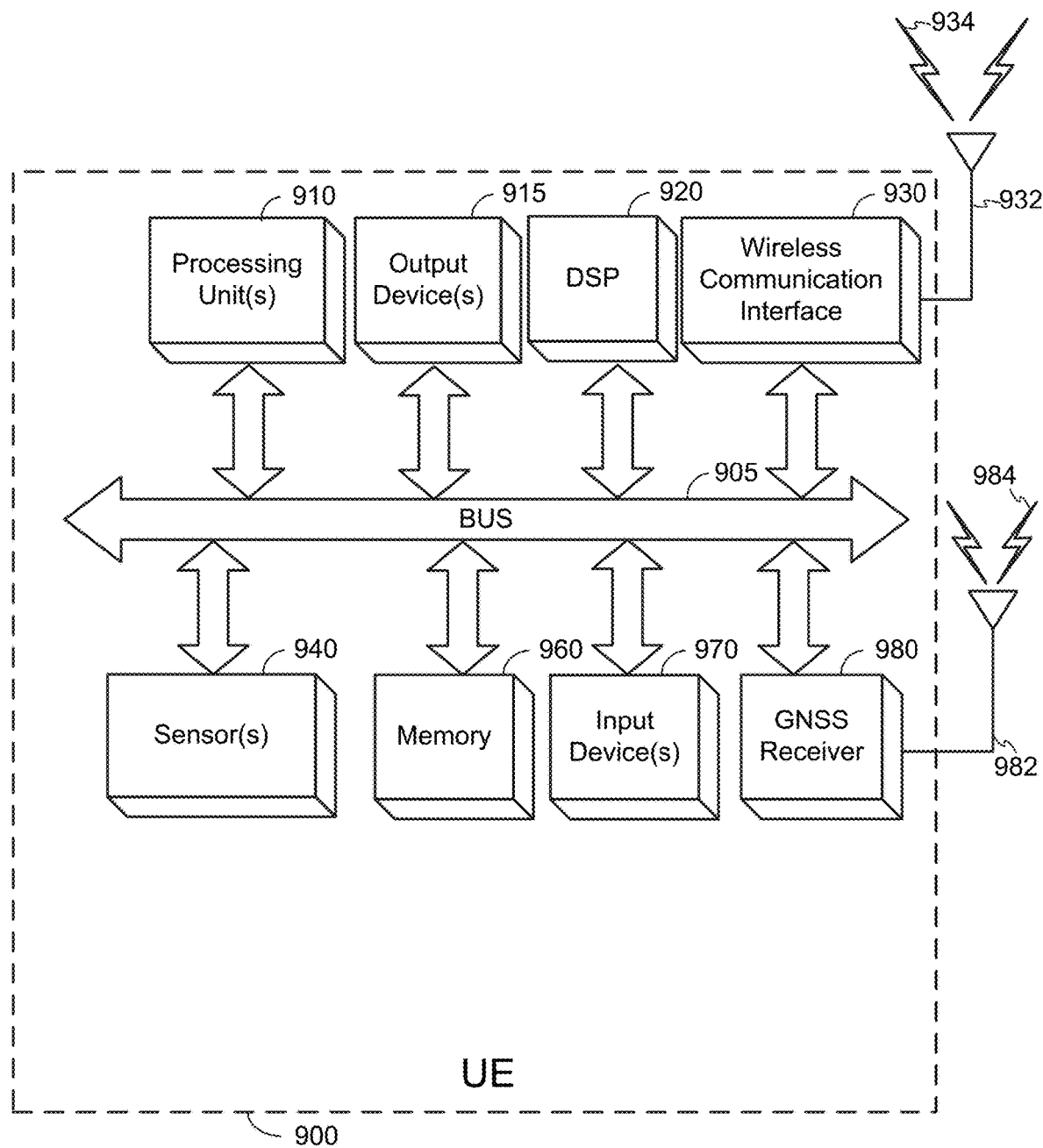
FIG. 9 is a block diagram of an embodiment of a UE.

FIG. 9 illustrates an embodiment of a UE 900, which can be utilized as described herein above. For example, the UE 900 can perform one or more of the functions of method 400 of FIG. 4. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations (e.g., located at different parts of a user's body, in which case the components may be communicatively connected via a Personal Area Network (PAN) and/or other means).

The UE 900 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 9, some embodiments may have a separate Digital Signal Processor (DSP) 920, depending on desired functionality. Location determination and/or other determinations based on wireless communication may be provided in the processing unit(s) 910 and/or wireless communication interface 930 (discussed below). The UE 900 also can include one or more input devices 970, which can include without limitation a keyboard, touch screen, a touch pad, microphone, button(s), dial(s), switch(es), and/or the like; and one or more output devices 915, which can include without limitation a display, light emitting diode (LED), speakers, and/or the like.

The UE 900 may also include a wireless communication interface 930, which may comprise without limitation a modem, a network card, an infrared communication device, a wireless communication device, and/or a chipset (such as a BLUETOOTH® device, an IEEE® 802.11 device, an IEEE® 802.15.4 device, a WI-FI® device, a WiMax device, a WAN device and/or various cellular devices, etc.), and/or the like, which may enable the UE 900 to communicate via the networks described above with regard to FIG. 1. The wireless communication interface 930 may permit data and signaling to be communicated (e.g. transmitted and received) with a network, for example, via eNBs, gNBs, ng-eNBs, access points, various base stations and/or other access node types, and/or other network components, computer systems, and/or any other electronic devices described herein. The communication can be carried out via one or more wireless communication antenna(s) 932 that send and/or receive wireless signals 934.

Depending on desired functionality, the wireless communication interface 930 may comprise separate transceivers to communicate with base stations (e.g., ng-eNBs and gNBs) and other terrestrial transceivers, such as wireless devices and access points. The UE 900 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as CDMA2000, Wideband CDMA (WCDMA), and so on. CDMA2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from the Third Generation Partnership Project (3GPP). CDMA2000 is described in documents from a consortium named "3rd Generation Partnership Project 2" (3GPP2). 3GPP and 3GPP2 documents are publicly available. A wireless local area network (WLAN) may also be an IEEE® 802.11x network, and a wireless personal area network (WPAN) may be a Bluetooth network, an IEEE® 802.15x, or some other type of network. The techniques described herein may also be used for any combination of WWAN, WLAN and/or WPAN.

The UE 900 can further include sensor(s) 940. Sensors 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein, in some instances.

Embodiments of the UE 900 may also include a GNSS receiver 980 capable of receiving signals 984 from one or more GNSS satellites (e.g., space vehicles (SVs)) using an antenna 982 (which could be the same as antenna 932). Positioning based on GNSS signal measurement can be utilized to complement and/or incorporate the techniques described herein. The GNSS receiver 980 can extract a position of the UE 900, using conventional techniques, from GNSS SVs of a GNSS system (e.g., Satellite 110 of FIG. 1), such as Global Positioning System (GPS), Galileo, Glonass, Quasi-Zenith Satellite System (QZSS) over Japan, Indian Regional Navigational Satellite System (IRNSS) over India, Beidou over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, such as, e.g., WAAS, EGNOS, Multi-functional Satellite Augmentation System (MSAS), and Geo Augmented Navigation system (GAGAN), and/or the like.

The UE 900 may further include and/or be in communication with a memory 960. The memory 960 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 960 of the UE 900 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the UE 900 (and/or processing unit(s) 910 or DSP 920 within UE 900). In an aspect, then, such code and/or instructions can be used to configure and/or adapt a general-purpose computer (or other device) to perform one or more operations in accordance with the described methods.

Figure 10:
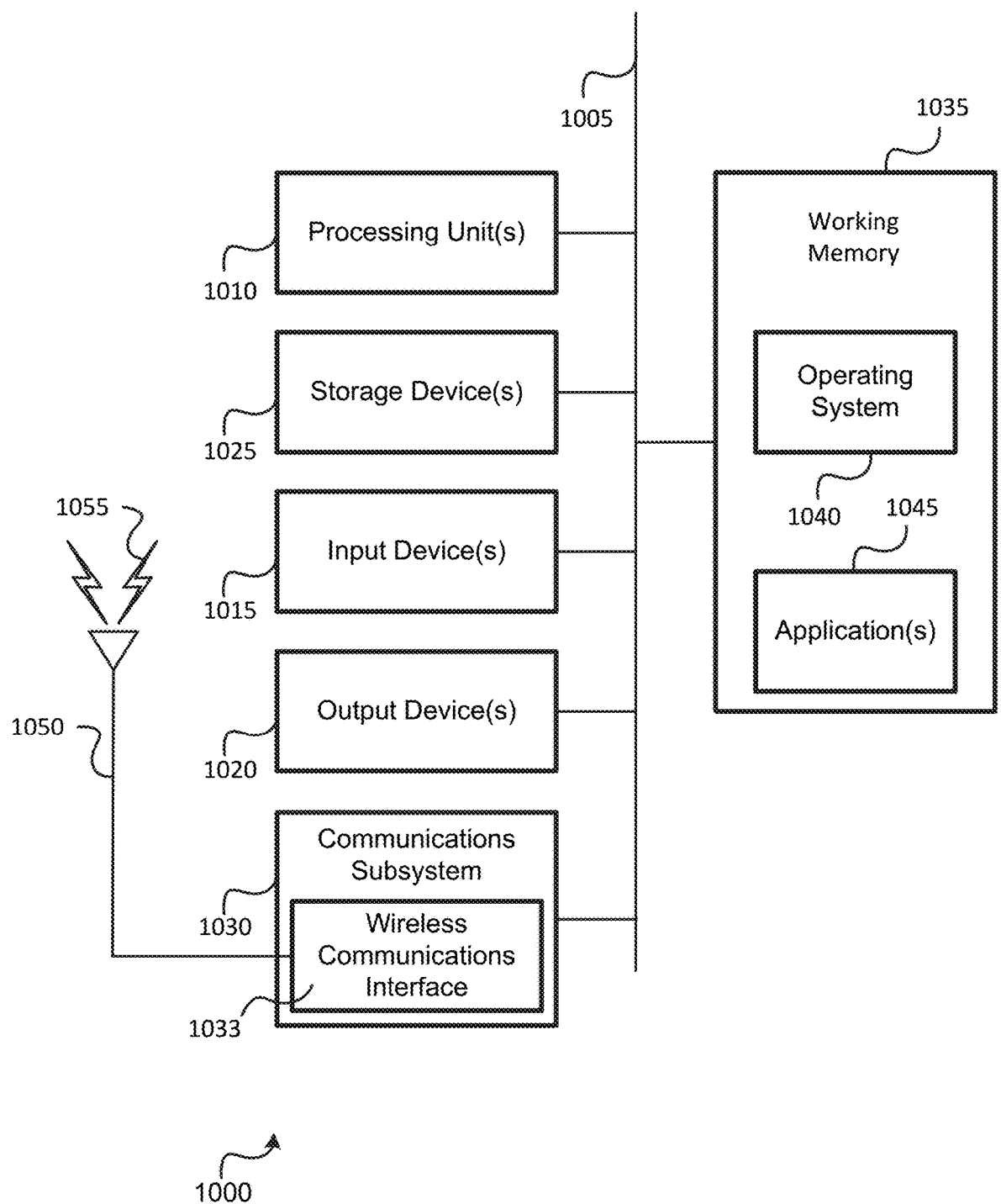
FIG. 10 is a block diagram of an embodiment of a computer system.

FIG. 10 illustrates an embodiment of a computer system 1000, which may be utilized and/or incorporated into one or more components of a communication system (e.g., communication system 100 of FIG. 1), including various components of a 5G network, such as the NG-RAN, 5GCN, and/or similar components of other network types. FIG. 10 provides a schematic illustration of one embodiment of a computer system 1000 that can perform the methods provided by various other embodiments, such as the methods described in relation to FIGS. 1-8. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be disposed at different physical or geographical locations. In some embodiments, the computer system 1000 may correspond to server 115 of FIG. 1 or an H-SLP (or other SLP), a gNB, another cellular or non-cellular access node, a UDM, and H-SMF, and/or some other type of location-capable device.

The computer system 1000 is shown comprising hardware elements that can be electrically coupled via a bus 1005 (or may otherwise be in communication, as appropriate). The hardware elements may include processing unit(s) 1010, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 10. The computer system 1000 also can include one or more input devices 1015, which can include without limitation a mouse, a keyboard, a camera, a microphone, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 may also include a communications subsystem 1030, which may comprise wireless communication technologies managed and controlled by a wireless communication interface 1033, as well as wired technologies (such as Ethernet, coaxial communications, universal serial bus (USB), and the like). The wireless communication interface 1033 may send and receive wireless signals 1055 (e.g. signals according to 5th Generation New Radio (5G NR) or LTE) via wireless antenna(s) 1050. Thus the communications subsystem 1030 may comprise a modem, a network card (wireless or wired), an infrared communication device, a wireless communication device, and/or a chipset, and/or the like, which may enable the computer system 1000 to communicate on any or all of the communication networks described herein to any device on the respective network, including a User Equipment (UE), other computer systems (e.g., server 115), and/or any other electronic devices described herein. Hence, the communications subsystem 1030 may be used to receive and send data as described in the embodiments herein.

In many embodiments, the computer system 1000 will further comprise a working memory 1035, which can include a RAM and/or or ROM device. Software elements, shown as being located within the working memory 1035, can include an operating system 1040, device drivers, executable libraries, and/or other code, such as application(s) 1045, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 10, may be implemented as code and/or instructions that are stored (e.g. temporarily) in working memory 1035 and are executable by a computer (and/or a processing unit within a computer such as processing unit(s) 1010); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Implementation examples are described in the following numbered clauses.

Clause 1. A method of mitigating multipath errors, the method comprising:
calculating, by a mobile device, a first pseudorange measurement based on a first signal received from a satellite on a first carrier frequency;
calculating, by the mobile device, a second pseudorange measurement based on a second signal received from the satellite on a second carrier frequency;
computing, by the mobile device, a difference between the first pseudorange measurement and the second pseudorange measurement;

determining, by the mobile device and based on the difference being above a threshold value and one of the first pseudorange measurement and the second pseudorange measurement being larger, that the larger pseudorange measurement is an impaired measurement; and based on determining that the larger pseudorange measurement is an impaired measurement, at least one of:

limiting, by the mobile device, an extent to which the impaired measurement is used in a first calculation performed by a processing unit of the mobile device using one or more of the first pseudorange measurement and the second pseudorange measurement, or communicating, by the mobile device, an impairment indication to a processing unit configured to perform a second calculation using one or more of the first pseudorange measurement and the second pseudorange measurement.

Clause 2. The method of clause 1, wherein the threshold value is based on at least one of a chip rate of a transmitter of the first signal, the first carrier frequency, or a modulation type of the first signal, and wherein the difference being above the threshold value is indicative of the first pseudorange measurement being impaired.

Clause 3. The method of clause 1, further comprising:
setting, by the mobile device, a flag value to indicate the impaired measurement;
calculating, by the mobile device, a geographical location of the mobile device; and
limiting, by the mobile device and based on the flag value, an extent to which the impaired measurement is used in the calculating of the geographical location of the mobile device.

Clause 4. The method of clause 3, wherein limiting the extent to which the impaired measurement is used in the calculating of the geographical location of the mobile device comprises:
weighting the impaired measurement based on the flag value.

Clause 5. The method of clause 4, wherein the weighting of the impaired measurement comprises determining a weight based on the difference between the first pseudorange measurement and the second pseudorange measurement.

Clause 6. The method of clause 3, wherein limiting the extent to which the impaired measurement is used in the calculating of the geographical location of the mobile device comprises:
excluding the impaired measurement from being used in the calculating of the geographical location of the mobile device.

Clause 7. The method of clause 6, wherein the excluding of the impaired measurement is conditioned upon determining, by the mobile device, that there is at least a threshold number of pseudorange measurements that are not impaired.

Clause 8. The method of clause 1, further comprising:
setting, by the mobile device, a flag value to indicate the impaired measurement; and
communicating, by the mobile device and as the impairment indication, the flag value or a value indicative of an uncertainty level of the impaired measurement.

Clause 9. The method of clause 8, wherein the communication of the impairment indication is performed via an application programming interface of the mobile device.

Clause 10. The method of clause 8, wherein the second calculation involves calculating an ionospheric delay for the satellite based at least in part on the first pseudorange measurement, the second pseudorange measurement, and the flag value.

Clause 11. The method of clause 1, further comprising:
limiting, by the mobile device, an extent to which the impaired measurement is used in a time calculation performed by the processing unit of the mobile device using one or more of the first pseudorange measurement and the second pseudorange measurement;
determining, by the mobile device, a clock error of a local clock based on a time estimate resulting from the time calculation; and
adjusting the local clock to correct the clock error.

Clause 12. The method of clause 11, further comprising:
after adjusting the local clock to correct the clock error, engaging in synchronous communication with a second device, the synchronous communication involving sending a message during a time slot assigned to the mobile device or receiving a message during a time slot assigned to the second device.

Clause 13. The method of clause 1, further comprising:
determining, by the mobile device, that there are a threshold number of impaired pseudorange measurements from satellites in a region of a sky; and
based on the determining that there are a threshold number of impaired pseudorange measurements from satellites in the region of the sky, excluding, by the mobile device, all pseudorange measurements associated with the region of the sky from the first calculation or the second calculation.

Clause 14. The method of clause 1, further comprising:
determining, by the mobile device, that there are a threshold number of impaired pseudorange measurements from satellites in a region of a sky;
determining, by the mobile device, that there is at least one satellite in the region of the sky that transmitted a plurality of signals on different carrier frequencies, where at least one but fewer than all of the plurality of signals is a basis for a pseudorange measurement that has been not been flagged as impaired; and
based on determining that there is at least one satellite in the region of the sky that transmitted a plurality of signals on different carrier frequencies, where at least one but fewer than all of the plurality of signals is a basis for a pseudorange measurement that has been not been flagged as impaired, permitting a pseudorange measurement calculated based on the at least one of the plurality of signals to be used in the first calculation or the second calculation.

Clause 15. The method of clause 1, further comprising:
tracking, by the mobile device, the difference between the first pseudorange measurement and the second pseudorange measurement over multiple measurement periods; and
determining, by the mobile device, a correction value for the impaired measurement based on values of the difference between the first pseudorange measurement and the second pseudorange measurement over the multiple measurement periods.

Clause 16. The method of clause 1, further comprising:
subtracting a bias value from the difference between the first pseudorange measurement and the second pseudorange measurement to update a value of the difference before determining that the difference is above the threshold value, wherein the bias value represents a relative timing delay between a first signal path along which the first pseudorange measurement is calculated and a second signal path along which the second pseudorange measurement is calculated.

Clause 17. The method of clause 1, further comprising:
before computing the difference between the first pseudorange measurement and the second pseudorange measurement:

subtracting a first bias value from the first pseudorange measurement, wherein the first bias value represents a timing delay of a first signal path along which the first pseudorange measurement is calculated; and subtracting a second bias value from the second pseudorange measurement, wherein the second bias value represents a timing delay of a second signal path along which the second pseudorange measurement is calculated.

Clause 18. A wireless device comprising:

a wireless receiver configured to receive a first signal from a satellite on a first carrier frequency and a second signal from the satellite on a second carrier frequency;

a memory; and one or more processing units communicatively coupled with the wireless receiver and the memory, the one or more processing units configured to:

calculate, a first pseudorange measurement based on the first signal;

calculate a second pseudorange measurement based on the second signal;

compute a difference between the first pseudorange measurement and the second pseudorange measurement;

determine, based on the difference being above a threshold value and one of the first pseudorange measurement and the second pseudorange measurement being larger, that the larger pseudorange measurement is an impaired measurement; and based on determining that the larger pseudorange measurement is an impaired measurement, at least one of:
limit an extent to which the impaired measurement is used in a first calculation performed by the one or more processing units using one or more of the first pseudorange measurement and the second pseudorange measurement, or communicate an impairment indication to a processing unit configured to perform a second calculation using one or more of the first pseudorange measurement and the second pseudorange measurement.

Clause 19. The wireless device of clause 18, wherein the one or more processing units are further configured to:

set a flag value to indicate the impaired measurement;

calculate a geographical location of the wireless device; and limit, based on the flag value, an extent to which the impaired measurement is used in the calculating of the geographical location of the wireless device.

Clause 20. The wireless device of clause 19, wherein to limit the extent to which the impaired measurement is used in the calculating of the geographical location of the wireless device, the one or more processing units are configured to:

weight the impaired measurement based on the difference between the first pseudorange measurement and the second pseudorange measurement.

Clause 21. The wireless device of clause 19, wherein to limit the extent to which the impaired measurement is used in the calculating of the geographical location of the wireless device, the one or more processing units are configured to:

exclude the impaired measurement from being used in the calculating of the geographical location of the wireless device.

Clause 22. The wireless device of clause 18, wherein the one or more processing units are further configured to:

set a flag value to indicate the impaired measurement; and communicate, as the impairment indication, the flag value or a value indicative of an uncertainty level of the impaired measurement.

Clause 23. The wireless device of clause 18, wherein the one or more processing units are further configured to:

limit an extent to which the impaired measurement is used in a time calculation performed by the one or more processing units using one or more of the first pseudorange measurement and the second pseudorange measurement;

determine a clock error of a local clock based on a time estimate resulting from the time calculation; and adjust the local clock to correct the clock error.

Clause 24. The wireless device of clause 23, wherein the one or more processing units are further configured to:

after adjusting the local clock to correct the clock error, engage in synchronous communication with a second device, the synchronous communication involving sending a message during a time slot assigned to the wireless device or receiving a message during a time slot assigned to the second device.

Clause 25. The wireless device of clause 18, wherein the one or more processing units are further configured to:

determine that there are a threshold number of impaired pseudorange measurements from satellites in a region of a sky; and based on determining that there are a threshold number of impaired pseudorange measurements from satellites in the region of the sky, exclude all pseudorange measurements associated with the region of the sky from the first calculation or the second calculation.

Clause 26. The wireless device of clause 18, wherein the one or more processing units are further configured to:

determine that there are a threshold number of impaired pseudorange measurements from satellites in a region of a sky;

determine that there is at least one satellite in the region of the sky that transmitted a plurality of signals on different carrier frequencies, where at least one but fewer than all of the plurality of signals is a basis for a pseudorange measurement that has been not been flagged as impaired; and based on determining that there is at least one satellite in the region of the sky that transmitted a plurality of signals on different carrier frequencies, where at least one but fewer than all of the plurality of signals is a basis for a pseudorange measurement that has been not been flagged as impaired, permit a pseudorange measurement calculated based on the at least one of the plurality of signals to be used in the first calculation or the second calculation.

Clause 27. The wireless device of clause 18, wherein the one or more processing units are further configured to:

track the difference between the first pseudorange measurement and the second pseudorange measurement over multiple measurement periods; and determine a correction value for the impaired measurement based on values of the difference between the first pseudorange measurement and the second pseudorange measurement over the multiple measurement periods.

Clause 28. The wireless device of clause 27, wherein the one or more processing units are configured to determine the correction value based on an average of the difference between the first pseudorange measurement and the second pseudorange measurement over the multiple measurement periods.

Clause 29. A wireless device comprising:

a pseudorange subsystem configured to calculate a first pseudorange measurement based on a first signal received from a satellite on a first carrier frequency, wherein the pseudorange subsystem is further configured to calculate a second pseudorange measurement based on a second signal received from the satellite on a second carrier frequency;

means for computing a difference between the first pseudorange measurement and the second pseudorange measurement;

means for determining, based on the difference being above a threshold value and one of the first pseudorange measurement and the second pseudorange measurement being larger, that the larger pseudorange measurement is an impaired measurement; and at least one of:
means for limiting an extent to which the impaired measurement is used in a first calculation performed by a processing unit of the wireless device using one or more of the first pseudorange measurement and the second pseudorange measurement, or means for communicating an impairment indication to a processing unit configured to perform a second calculation using one or more of the first pseudorange measurement and the second pseudorange measurement.

Clause 30. A non-transitory computer-readable medium storing instructions therein for execution by one or more processing units, comprising instructions to:

calculate a first pseudorange measurement based on a first signal received from a satellite on a first carrier frequency;

calculate a second pseudorange measurement based on a second signal received from the satellite on a second carrier frequency;

compute a difference between the first pseudorange measurement and the second pseudorange measurement;

determine, based on the difference being above a threshold value and one of the first pseudorange measurement and the second pseudorange measurement being larger, that the larger pseudorange measurement is an impaired measurement; and based on determining that the larger pseudorange measurement is an impaired measurement, at least one of:

limit an extent to which the impaired measurement is used in a first calculation performed by the one or more processing units using one or more of the first pseudorange measurement and the second pseudorange measurement, or communicate an impairment indication to a processing unit configured to perform a second calculation using one or more of the first pseudorange measurement and the second pseudorange measurement.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of position determination at a mobile device, the method comprising:

obtaining a set of satellite signal measurements through measuring, for each satellite in a first plurality of satellites, a first signal from the satellite in a first frequency band and a second signal from the satellite in a second frequency band, wherein the first plurality of satellites includes at least a first satellite, a second satellite, and a third satellite;

determining that at least one measurement in the set of satellite signal measurements is impaired, based on a difference between a measurement of the first signal from a particular satellite and a measurement of the second signal from the particular satellite, wherein determining that the at least one measurement in the set of satellite signal measurements is impaired comprises determining that the difference exceeds one or more thresholds, and wherein the one or more thresholds include a first threshold associated with the first signal from the particular satellite and a second threshold associated with the second signal from the particular satellite; and determining a position of the mobile device based on non-impaired measurements in the set of satellite signal measurements.

2. The method of claim 1, wherein the set of satellite signal measurements comprises, for each satellite in the first plurality of satellites, a pseudorange measurement of the first signal from the satellite and a pseudorange measurement of the second signal from the satellite.

3. The method of claim 1, wherein the difference represents a difference between a time delay of the first signal from the particular satellite and a time delay of the second signal from the particular satellite.

4. The method of claim 1, wherein the first plurality of satellites includes satellites that are within view of the mobile device in one or more regions of a sky, and wherein each region of the one or more regions spans a range of azimuth angles, a range of elevation angles, or both.

5. The method of claim 4, wherein each region of the one or more regions corresponds to one of four quadrants.

6. The method of claim 4, wherein:

the set of satellite signal measurements includes measurements of signals from a second plurality of satellites, the second plurality of satellites includes satellites in a first region of the one or more regions, and determining that the at least one measurement in the set of satellite signal measurements is impaired comprises determining that all the measurements of signals from the second plurality of satellites are impaired, based on the first region being associated with more than a threshold number of impaired measurements.

7. The method of claim 6, wherein the measurements of signals from the second plurality of satellites include at least one measurement that is otherwise non-impaired.

8. The method of claim 1, further comprising:

determining the position of the mobile device using the non-impaired measurements in combination with a first impaired measurement, wherein the first impaired measurement is the measurement of the first signal from the particular satellite or the measurement of the second signal from the particular satellite, and wherein the first impaired measurement is used to a lesser extent than the non-impaired measurements.

9. The method of claim 8, further comprising:

weighting the first impaired measurement, wherein the weighting decreases a contribution of the first impaired measurement relative to the non-impaired measurements.

10. The method of claim 8, further comprising:

determining a weight to apply to the first impaired measurement, based on the difference between the measurement of the first signal from the particular satellite and the measurement of the second signal from the particular satellite.

11. The method of claim 1, further comprising:

excluding every impaired measurement from being used in determining the position of the mobile device, based on determining that the set of satellite signal measurements includes a least a threshold number of non-impaired measurements.

12. A method of position determination at a mobile device, the method comprising:
obtaining a set of satellite signal measurements through measuring, for each satellite in a first plurality of satellites, a first signal from the satellite in a first frequency band and a second signal from the satellite in a second frequency band, wherein the first plurality of satellites includes at least a first satellite, a second satellite, and a third satellite;
determining that at least one measurement in the set of satellite signal measurements is impaired, based on a difference between a measurement of the first signal from a particular satellite and a measurement of the second signal from the particular satellite;
determining an observed ionospheric delay based on the difference; and
determining that the measurement of the first signal from the particular satellite or the measurement of the second signal from the particular satellite is impaired through comparing the observed ionospheric delay to an expected ionospheric delay.

13. A wireless device comprising:
a wireless receiver configured to receive satellite signals from at least a first plurality of satellites, the satellite signals including, for each satellite in the first plurality of satellites, a first signal from the satellite in a first frequency band and a second signal from the satellite in a second frequency band, wherein the first plurality of satellites includes at least a first satellite, a second satellite, and a third satellite;
a memory; and
one or more processing units communicatively coupled with the wireless receiver and the memory, the one or more processing units configured to:
obtain a set of satellite signal measurements corresponding to measurements of the satellite signals received by the wireless receiver;
determine that at least one measurement in the set of satellite signal measurements is impaired, based on a difference between a measurement of the first signal from a particular satellite and a measurement of the second signal from the particular satellite, wherein, to determine that the at least one measurement in the set of satellite signal measurements is impaired, the one or more processing units are configured to determine that the difference exceeds one or more thresholds, and wherein the one or more thresholds include a first threshold associated with the first signal from the particular satellite and a second threshold associated with the second signal from the particular satellite; and
determine a position of the wireless device based on non-impaired measurements in the set of satellite signal measurements.

14. The wireless device of claim 13, wherein the set of satellite signal measurements comprises, for each satellite in the first plurality of satellites, a pseudorange measurement of the first signal from the satellite and a pseudorange measurement of the second signal from the satellite.

15. The wireless device of claim 13, wherein the difference represents a difference between a time delay of the first signal from the particular satellite and a time delay of the second signal from the particular satellite.

16. The wireless device of claim 13, wherein the first plurality of satellites includes satellites that are within view of the wireless device in one or more regions of a sky, and wherein each region of the one or more regions spans a range of azimuth angles, a range of elevation angles, or both.

17. The wireless device of claim 16, wherein each region of the one or more regions corresponds to one of four quadrants.

18. The wireless device of claim 16, wherein:
the set of satellite signal measurements includes measurements of signals from a second plurality of satellites,
the second plurality of satellites includes satellites in a first region of the one or more regions, and
the one or more processing units are configured to, as part of determining that the at least one measurement in the set of satellite signal measurements is impaired, determine that all the measurements of signals from the second plurality of satellites are impaired, based on the first region being associated with more than a threshold number of impaired measurements.

19. The wireless device of claim 18, wherein the measurements of signals from the second plurality of satellites include at least one measurement that is otherwise non-impaired.

20. The wireless device of claim 13, wherein:
the one or more processing units are configured to determine the position of the wireless device using the non-impaired measurements in combination with a first impaired measurement,
the first impaired measurement is the measurement of the first signal from the particular satellite or the measurement of the second signal from the particular satellite, and
the first impaired measurement is used to a lesser extent than the non-impaired measurements.

21. The wireless device of claim 20, wherein the one or more processing units are further configured to weight the first impaired measurement such that a contribution of the first impaired measurement is decreased relative to the non-impaired measurements.

22. The wireless device of claim 20, wherein the one or more processing units are further configured to determine a weight to apply to the first impaired measurement, based on the difference between the measurement of the first signal from the particular satellite and the measurement of the second signal from the particular satellite.

23. The wireless device of claim 13, wherein the one or more processing units are further configured to exclude every impaired measurement from being used in determining the position of the wireless device, based on determining that the set of satellite signal measurements includes a least a threshold number of non-impaired measurements.

24. A wireless device comprising:
a wireless receiver configured to receive satellite signals from at least a first plurality of satellites, the satellite signals including, for each satellite in the first plurality of satellites, a first signal from the satellite in a first frequency band and a second signal from the satellite in a second frequency band, wherein the first plurality of satellites includes at least a first satellite, a second satellite, and a third satellite;
a memory; and
one or more processing units communicatively coupled with the wireless receiver and the memory, the one or more processing units configured to:

obtain a set of satellite signal measurements corresponding to measurements of the satellite signals received by the wireless receiver;
determine that at least one measurement in the set of satellite signal measurements is impaired, based on a difference between a measurement of the first signal from a particular satellite and a measurement of the second signal from the particular satellite;
determine an observed ionospheric delay based on the difference;
determine that the measurement of the first signal from the particular satellite or the measurement of the second signal from the particular satellite is impaired through comparing the observed ionospheric delay to an expected ionospheric delay; and
determine a position of the wireless device based on non-impaired measurements in the set of satellite signal measurements.

25. A non-transitory computer-readable medium storing instructions therein for execution by one or more processing units, comprising instructions to:
obtain a set of satellite signal measurements through measuring, at a mobile device and for each satellite in a first plurality of satellites, a first signal from the satellite in a first frequency band and a second signal from the satellite in a second frequency band, wherein the first plurality of satellites includes at least a first satellite, a second satellite, and a third satellite;
determine that at least one measurement in the set of satellite signal measurements is impaired, based on a difference between a measurement of the first signal from a particular satellite and a measurement of the second signal from the particular satellite, wherein, to determine that the at least one measurement in the set of satellite signal measurements is impaired, the non-transitory computer-readable medium further comprises instructions to determine that the difference exceeds one or more thresholds, and wherein the one or more thresholds include a first threshold associated with the first signal from the particular satellite and a second threshold associated with the second signal from the particular satellite; and
determine a position of the mobile device based on non-impaired measurements in the set of satellite signal measurements.

26. The non-transitory computer-readable medium of claim 25, wherein:
the first plurality of satellites includes satellites that are within view of the mobile device in one or more regions of a sky,
each region of the one or more regions spans a range of azimuth angles, a range of elevation angles, or both
the set of satellite signal measurements includes measurements of signals from a second plurality of satellites,
the second plurality of satellites includes satellites in a first region of the one or more regions, and
determining that the at least one measurement in the set of satellite signal measurements is impaired comprises determining that all the measurements of signals from the second plurality of satellites are impaired, based on the first region being associated with more than a threshold number of impaired measurements.

\* \* \* \* \*